United States Patent
Yao

(10) Patent No.: US 10,824,445 B2
(45) Date of Patent: Nov. 3, 2020

(54) DYNAMIC PRESENTATION OF FUNCTION PORTALS

(71) Applicant: Alibaba Group Holding Limited, George Town (KY)

(72) Inventor: Wei Yao, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 16/128,119

(22) Filed: Sep. 11, 2018

(65) Prior Publication Data

US 2019/0065219 A1 Feb. 28, 2019

Related U.S. Application Data

(63) Continuation-in-part of application No. PCT/CN2017/077504, filed on Mar. 21, 2017.

(30) Foreign Application Priority Data

Mar. 30, 2016 (CN) .......................... 2016 1 0195482

(51) Int. Cl.
*G06F 3/048* (2013.01)
*G06F 9/451* (2018.01)
*G06F 3/0488* (2013.01)
*G06F 3/0346* (2013.01)
*G06F 3/0485* (2013.01)
*G06F 11/34* (2006.01)
*G06F 3/0483* (2013.01)

(52) U.S. Cl.
CPC ............ *G06F 9/451* (2018.02); *G06F 3/0346* (2013.01); *G06F 3/0485* (2013.01); *G06F 3/0488* (2013.01); *G06F 3/04886* (2013.01); *G06F 11/3438* (2013.01); *G06F 3/0483* (2013.01)

(58) Field of Classification Search
CPC ...... G06F 9/451; G06F 3/0346; G06F 3/0485; G06F 11/3438; G06F 3/0483; G06F 3/0488; G06F 3/04886; G06F 3/0484
See application file for complete search history.

(56) References Cited

U.S. PATENT DOCUMENTS

| 6,917,373 B2* | 7/2005 | Vong ..................... G06F 3/0481 715/805 |
| 7,975,020 B1 | 7/2011 | Green |
| 2011/0016391 A1* | 1/2011 | Borovsky ............. G06F 3/0482 715/702 |

(Continued)

FOREIGN PATENT DOCUMENTS

| CN | 102082874 | 6/2011 |
| CN | 102193784 | 9/2011 |

(Continued)

*Primary Examiner* — Alex Olshannikov
(74) *Attorney, Agent, or Firm* — Van Pelt, Yi & James LLP

(57) ABSTRACT

Dynamically presenting function portals is described, including: determining a user action with respect to a current page of an application; determining a context with respect to the application; determining a function portal based at least in part on the user action with respect to the current page of the application and the context with respect to the application; presenting the function portal at the current page of the application; and in response to a selection of the function portal, performing an operation corresponding to the function portal at the current page of the application.

21 Claims, 21 Drawing Sheets

(56) References Cited

U.S. PATENT DOCUMENTS

| | | |
|---|---|---|
| 2011/0197124 A1 | 8/2011 | Garaventa |
| 2011/0307880 A1 | 12/2011 | Hilerio |
| 2014/0173474 A1 | 6/2014 | Klemenz |
| 2014/0208216 A1* | 7/2014 | Koo ...................... G06F 3/0484 715/736 |
| 2015/0378600 A1* | 12/2015 | Sloan .................... G06F 3/0482 715/773 |
| 2016/0196584 A1 | 7/2016 | Franklin |
| 2017/0017497 A1* | 1/2017 | Shimada ............ G01C 21/3608 |
| 2017/0060396 A1* | 3/2017 | Lewis .................. G06F 3/04847 |
| 2018/0075066 A1* | 3/2018 | Zhang .................. G06F 3/0488 |

FOREIGN PATENT DOCUMENTS

| | | |
|---|---|---|
| CN | 102968252 | 3/2013 |
| CN | 104216600 | 12/2014 |
| CN | 104965633 | 10/2015 |

\* cited by examiner

DYNAMIC PRESENTATION OF FUNCTION PORTALS

CROSS REFERENCE TO OTHER APPLICATIONS

This application is a continuation-in-part of and claims priority to International (PCT) Application No. PCT/CN2017/77504 entitled PAGE PROCESSING METHOD, DEVICE AND INTELLIGENT TERMINAL filed Mar. 21, 2017 which is incorporated herein by reference for all purposes, which claims priority to People's Republic of China Patent Application No. 201610195482.X entitled A PAGE PROCESSING METHOD, MEANS, AND SMART TERMINAL filed Mar. 30, 2016 which is incorporated herein by reference for all purposes.

FIELD OF THE INVENTION

The present application relates to a field of application user interface technology. In particular, the present application relates to dynamically changing the user interface of a page of an application.

BACKGROUND OF THE INVENTION

As smart terminal technology develops, smart terminals have become capable of providing various services. Users can use applications in smart terminals to perform purchasing, entertainment, and various other operations.

In a smart terminal, individual pages of applications may present the functions (e.g., shopping, games, and telephone) that are provided by the applications. However, the correspondence of each function in a page to an operation is static within the page. That is, the position within a page at which each operation is presented is configured based on the design of the page (e.g., as determined by the code that is used to implement that page). If there are multiple operations, then operations must be sequentially laid out on the user interface, which easily uses up the limited display space of a device's screen. When performing an operation at a page of an application, the user must do so in accordance with the page's own design, e.g., by performing up or down scrolling operations and clicking one operation at a time. However, sometimes, this is not convenient for the user.

SUMMARY OF THE INVENTION

The technical problem that is to be solved by embodiments of the present application is how to provide page processing techniques in order to facilitate user action.

To solve the problem described above, the present application discloses techniques comprising:
  determining a user action with respect to a current page of an application;
  determining a context with respect to a presentation of the current page of the application;
  determining a function portal based at least in part on the context with respect to the presentation of the current page of the application and the user action with respect to the current page of the application;
  presenting the function portal at the current page of the application; and
  in response to a selection of the function portal, performing an operation corresponding to the function portal at the current page of the application.

BRIEF DESCRIPTION OF THE DRAWINGS

Various embodiments of the invention are disclosed in the following detailed description and the accompanying drawings.

DETAILED DESCRIPTION

Figure 1:
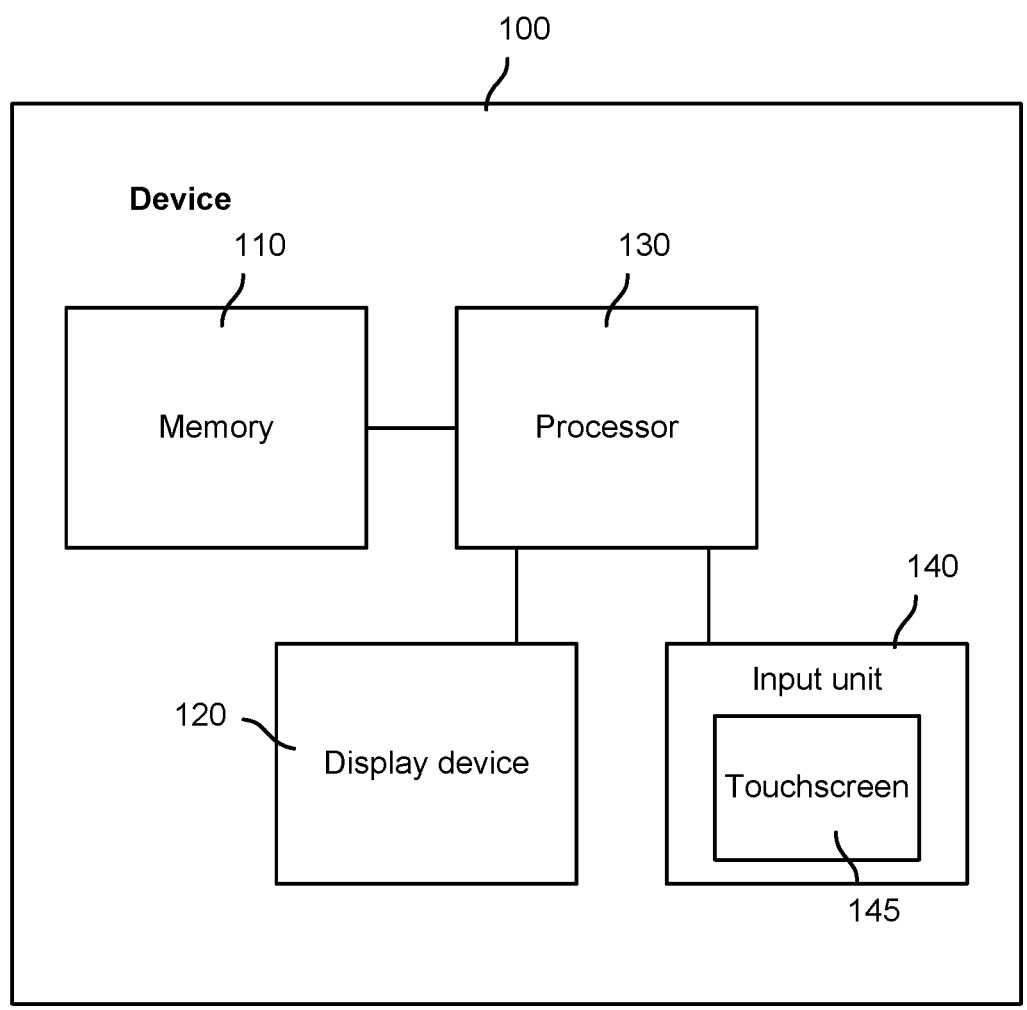
FIG. 1 is a diagram showing an embodiment of a device for dynamically presenting functional portals.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of dynamically presenting function portals are described herein. A user action with respect to a current page of an application is determined. For example, the user action may comprise scrolling up and/or down, scrolling side-to-side, opening a new page, clicking an element, and shaking the device. A context with respect to a presentation of the current page is determined. For example, the context with respect to the presentation of the current page includes which portion of the current page is viewable within the display screen of the device, which native operations of the current page are viewable (and therefore selectable) to the user, and/or which service is provided by the current page. A function portal is determined based at least in part on the context with respect to the presentation of the current page and the user action with respect to the current page. The function portal is presented at the current page of the application. In response to a selection of the functional portal, an operation corresponding to the function portal is performed at the current page of the application.

In various embodiments, a "function portal" is a selectable control that appears at a currently displayed page of an application that is executing at a device. After a presented function portal is selected by a user, an operation that corresponds to the function portal is performed with respect to the current displayed page of the application. Function portals associated with different functions may appear differently. A function portal's corresponding operation may supplement or complement any native operation that may already be available at the currently displayed page of the application. Even as a user navigates (e.g., scrolls) through the same page of an application, the function portal that is displayed at the page may dynamically change depending on the changing context of the presentation of the page and/or the user's actions. The dynamically presented function portals may intuitively assist the user in interacting with the displayed page of an application.

FIG. 1 is a diagram showing an embodiment of a device for dynamically presenting functional portals. Device 100 includes memory 110, display device 120, processor 130, and input unit 140. In some embodiments, device 100 is configured with multimedia functions (e.g., such as support audio, video, data, and other functions). Examples of device 100 include a mobile device, a tablet device, a computer, a smart television, a wearable device, or any other computing device.

Input unit 140 is configured to receive numeric or text information input by the user and control signals. Input unit 140 may include touchscreen 145, which may sense and capture touch actions thereon or nearby (e.g., actions by a user on touchscreen 145 using a finger, stylus, or any other suitable object or accessory) and drive a computer program based on a preset program. In some embodiments, in addition to touchscreen 145, input unit 140 may further include other input devices, such as, for example, a physical keyboard, function keys (such as a volume control key and an on/off key), and a mouse.

Display device 120 includes a display panel/screen. For example, the display panel is a liquid crystal display (LCD) or organic light-emitting diode (OLED) display. For example, touchscreen 145 may cover the display panel to form a touch display screen. When detecting a touch action thereon or nearby, the touch display screen transmits it to processor 130 to execute the corresponding processing.

In some embodiments, device 100 further includes one or more sensors that capture movement with respect to device 100, such as an accelerometer and/or a gravity sensor.

In various embodiments, processor 130 is configured to, based on calling a software program and/or module and/or data stored in memory 110, present a function portal at a current page of an application that is executing at device 100 based on a detected context and also a user action that is detected by input unit 140. In various embodiments, an application includes one or more pages, each page being configured to provide one or more services via native operations that are configured in the page's computer code. For example, a calling application may include a contact directory page, a recent calls page, a dialing page, and a frequent contacts page. In another example, a calendar application includes year, month, and date pages, and each date page may record journal notes, memos, or other such information. For example, the detected user action may include, but is not limited to, opening a new page, a scrolling action (e.g., scrolling left and right or scrolling up and down), a clicking action (e.g., a single click or a double click), and a shaking action. Examples of a function portal include, but are not limited to: a look-up portal, a search portal, an upload portal, a download portal, an edit portal, and a return portal. For example, a look-up portal is for looking up information, e.g., looking up a contact in a contact directory or looking up mail in an inbox. For example, a search portal is for executing searches, e.g., searching for an application in an application center (i.e., an application download application) page. For example, an upload portal is for uploading data information, e.g., uploading photos in a social networking application page. For example, a download portal is for performing data downloads, e.g., downloading or upgrading the corresponding application in an application page of an application center. For example, an edit portal is for executing edit operations on a page, e.g., adding a contact to a contact directory or changing a memo on a calendar date page. For example, a return portal is for executing return operations on the current page. For example, the return operation may be determined according to the page and user action. Examples include returning to a previous page or the user returning to the top of the page. In response to a receipt of an indication from input unit 140 that a user action has selected the presented function portal, processor 130 is configured to execute an operation corresponding to the selected function portal by calling a software program and/or module and/or data stored in memory 110.

In some embodiments, function portals may be generated using application programming interface (API) libraries. For example, one or more libraries associated with controller systems (e.g., AUI) are used to configure various function portals.

A user may perform various navigation and/or interactive actions, such as scrolling up or down to look up a contact, an application, or mail, with respect to a current page of an application that is displayed at a device. In addition to the user action, a context with respect to the presentation of the current page is also detected. For example, the context with respect to the presentation of the current page includes which portion of the current page is viewable within the display screen of the device, which native operations of the current page are viewable (and therefore selectable) to the user, and/or which service is provided by the current page. In various embodiments, the combination of the detected user action and the detected context is used to determine a function portal to be presented at the current page. In various embodiments, a function portal is implemented outside of the computer code that is used to implement the current page. In some embodiments, the function portal is presented as a floating element (e.g., button, interactive control, etc.) over the current page such that the function portal is visible to the user regardless if the current page is being scrolled through. Because more than one function portal is configured to be presentable at a certain page of an application, as either one or both of the detected user action and the context of the presentation of the current page changes, different function portals can be dynamically determined and presented at the current page to intuitively assist the user with use of the current page.

For example, a user may scroll up and down when viewing information on a page. As a result, the portion of the page that is currently being displayed at the display screen of the device adjusts accordingly. It could therefore be inferred from the user's up/down scrolling action that the user intends to look up something. In another example, a user may scroll left or right across a page to switch pages (e.g., within the same application or across different applications). It could therefore be inferred from the user's left/right scrolling action that the user intends to switch between services offered by different pages. As such, by detecting user actions and contexts of a presentation of a current page, it is possible to infer user intent with respect to a current page that a user is accessing/viewing and determine a corresponding function portal to present.

In some embodiments, a set of function configuration information including one or more candidate operations is configured and stored for each page of an application. The current page of the application that is being displayed at the device is determined and function configuration information corresponding to that current page is obtained from storage. Furthermore, a user action and a context with respect to the presentation of the current page are determined. An operation is identified from the set of candidate operations included in the function configuration information corresponding to the current page based on the detected user action and context. Then, a function portal corresponding to the identified operation is presented at the current page. If/when a user selection with the presented function portal is detected, a corresponding operation is performed at the current page. For example, if a look-up function portal is presented at the current page, then a user input of a string into the loop-up function portal is used to search for the entered string on that current page. If/when an updated user action and/or context is detected at the same current page, another operation may be identified from the set of candidate operations included in the function configuration information corresponding to the current page and the corresponding function portal may be presented at the current page, and so forth.

Figure 2:
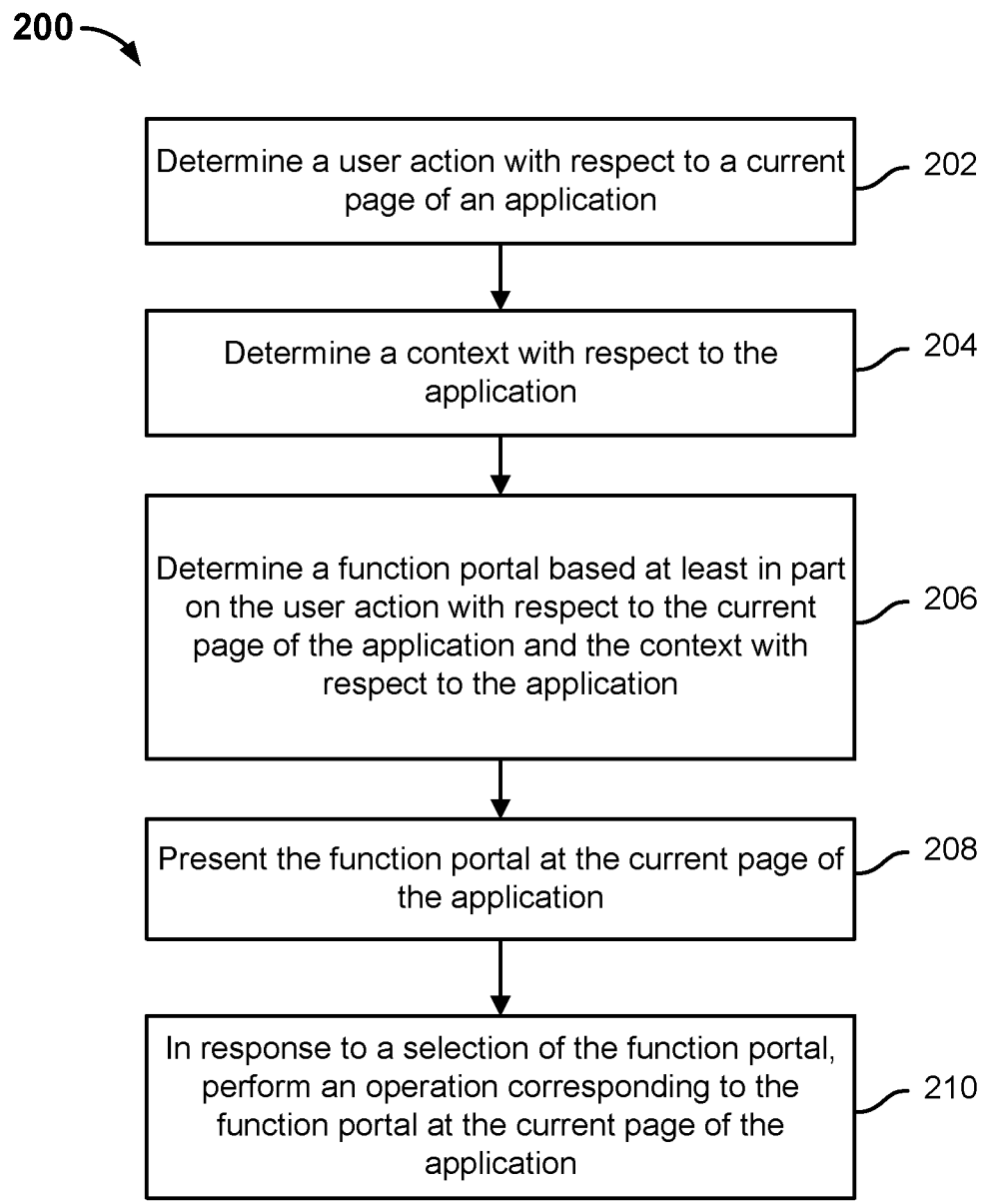
FIG. 2 is a flow diagram showing an embodiment of a process for dynamically presenting function portals.

FIG. 2 is a flow diagram showing an embodiment of a process for dynamically presenting function portals. In some embodiments, process 200 is implemented at device 100 of FIG. 1.

In some embodiments, process 200 is implemented by an operating system executing at the device. For example, the operating system may centrally implement process 200 for one or more applications that are executing at the device. In some embodiments, where process 200 is implemented by the operating system, each application that is installed at the device is configured to determine the one or more operations that it provides and sends a corresponding function configuration information that includes such candidate operations to the operating system so that the operating system, through monitoring the context with respect to the presentation of a current page of an application and a user action with respect to the current page, can identify an operation from the candidate operations included in the function configuration information corresponding to the application. The operating system then presents the function portal corresponding to the identified operation at the current page.

In some embodiments, process 200 is implemented by each individual application when one of its pages is being displayed at the device.

At 202, a user action with respect to a current page of an application is determined.

In some embodiments, application activity at the device is monitored and which page of an application, which is currently executing at a device, is currently being presented at the display screen of the device is determined. A user action with respect to the current page is detected via the touchscreen or other input element of the device. For example, the detected user action may include, but is not limited to, opening a new page, a scrolling action (e.g., scrolling left and right or scrolling up and down), a clicking action (e.g., a single click or a double click), and a shaking action.

At 204, a context with respect to the application is determined.

In various embodiments, a context with respect to the application comprises the context with respect to the current presentation of the current page of the application or other page(s) associated with the application. A context of a presentation of a current page includes, for example, the type of the application with which the current page is a part (e.g., utility, entertainment, productivity, etc.), one or more native operations that are included in the current page, and the portion of the current page that is currently visible at the display screen of the device (e.g., which native operations of the current page are actually accessible in the portion of the current page that is visible). In some embodiments, a "native operation" comprises an operation that is determined to be presented at a page of an application based on the computer code used to implement the page. For example, a search bar that is included in a directory of contacts in a calling application can be a native operation. For example, a native operation that is included in the current page could be a search field but depending on which portion of the current page is visible at the display screen (e.g., based on the user's scrolling/navigation through the current page), the native search operation may or may not be visible at the display screen. If the native search operation were visible at the display screen, then the user could access the native search operation but if the native search operation were not visible at the display screen, then the user could not access the native search operation.

At 206, a function portal is determined based at least in part on the user action with respect to the current page of the application and the context with respect to the application.

At 208, the function portal is presented at the current page of the application.

Based on the combination of the context of the application and the user action, an operation corresponding to a function portal is determined and as a result, the corresponding function portal may be presented at the current page. In some embodiments, a corresponding set of function configuration information, including one or more candidate operations, is configured for each page of an application. Furthermore, in some embodiments, the set of function configuration information includes a set of rules that defines corresponding relationships between user actions and corresponding candidate operations to present per various contexts of the presentation of the current page. For example, the rules included in a set of function configuration information may indicate that a look-up function portal is presented at a current page when the user scrolls up or down on the page, given that a native look-up operation is not included in the current page and/or is not visible in the portion of the current page that is currently presented at the display screen. For example, the rules included in the set of function configuration information may indicate that an upload or download portal (e.g., associated with downloading computer code associated with an application) is presented when a details page (e.g., a video detail page, an application details page, and an image details page) is presented at the display screen. For example, the rules may indicate that different function portals corresponding to different operations may be displayed based on different user actions. For example, one function portal is determined according to the page when the user enters the page and, when the user executes an action in the page, another function portal is again determined according to the user action. In some embodiments, the function portal is presented as a floating element that overlays the current page so that regardless of how the page is navigated after the presentation of the function portal, the function portal does not move from its position and remains visible.

In some embodiments, the combination of the context of the presentation of the current page and the user action is used to identify an operation included in a set of candidate operations that is included in the set of function configuration information. Then, the function portal corresponding to the identified operation is presented at the current page. As mentioned above, examples of a function portal include, but are not limited to: a look-up portal, a search portal, an upload portal, a download portal, an edit portal, and a return portal. For example, a look-up portal is for looking up information, e.g., looking up a contact in a contact directory or looking up mail in an inbox. For example, a search portal is for executing searches, e.g., searching for an application in an application center (i.e., an application download application) page. For example, an upload portal is for uploading data information, e.g., uploading photos in a social networking application page. For example, a download portal is for performing data downloads, e.g., downloading or upgrading the corresponding application in an application page of an application center. For example, an edit portal is for executing edit operations on a page, e.g., adding a contact to a contact directory or changing a memo on a calendar date page. For example, a return portal is for executing return operations on the current page. For example, the return operation may be determined according to the page and user action. Examples include returning to a previous page or the user returning to the top of the page.

At 210, in response to a selection of the function portal, an operation corresponding to the function portal is performed at the current page of the application.

While a user may navigate through a page of an application and interact with various native operations on the page, the layout of the page and the native operations thereof are statically configured. Therefore, as the user navigates the page, certain native operations may not be visible due to their being out of the portion of the current page that is visible in the display screen of the device and/or the current page lacks native operations that would be convenient for the user to use to interact with the current page. As such, by making useful operations available at a current page of an application via dynamically presenting function portals at the current page, a user that is interacting with the current page would be enabled to more efficiently and quickly access operations at the current page that are either native to the page but are not currently visible and/or are not native to the page but are helpful in using the current page. For example, if a user performs the user action of opening a page from a calendar application, a function portal that may be presented at the current page may correspond to the identified operation of entering a calendar event/memo. Or if the user performs the user action of scrolling up or down on a directory page of a contacts application, a function portal that may be presented at the current page may correspond to the identified operation of looking up contacts.

In some embodiments, the function portal is an independent portal outside the current page and therefore, it does not affect display of the content of the page that is determined by the computer code that is used to implement the page (e.g., the layout of the page, the native operations to be presented at the page, the textual or other information that is to be presented at the page). The function portal may have its position set according to the content of the page. For example, a function portal may be configured to be presented at the bottom of the page or at the top of the page. Or a function portal may be configured to be presented according to the user operating position in an area convenient to a user action, e.g., configured at an operating position on the touchscreen, or it may float on the page. In the case of a floating display, the function portal may float at a set position, or it may float at a position convenient to user action. The function portal may be displayed opaquely or displayed according to a set transparency level to avoid blocking screen content.

The user may select a displayed function portal and a response may be executed based on executing the operation corresponding to the function portal. For example, a search is executed based on a string that is input by a user input into a search function portal or a new application corresponding to the page may be downloaded based on a user selection of a download function portal.

In some embodiments, after a function portal is displayed, the display of the function portal may be cancelled if the user does not perform an action on the function portal within a set period of time. The period of time may be flexibly set by the system or by the user after entering a setting interface.

In some embodiments, after a function portal is displayed, the display of the function portal may be cancelled if the user exits the page or goes on to execute another operation, such as clicking on the screen or continuing to scroll.

In some embodiments, after a function portal is displayed, a fast cancel-display control may also be presented to help the user hide the function portal when there is no need to use the function portal. The manner of operating this fast cancel-display function may be a system default configuration, or it may be set by the user according to his or her own operating habits in the setting interface. For example, the fast cancel-display control may comprise a double click or a press-and-hold on the screen.

In summary, a function portal may be determined according to the context and user action with respect to the current page that is being displayed at the device. The function portal is displayed on the current page and a corresponding operation is performed if a user selects the function portal. The operation corresponding to the presented function portal may save the user time in navigating the page and/or application and/or may supplement/complement any existing content/operations that are already configured for the current page.

Figure 3:
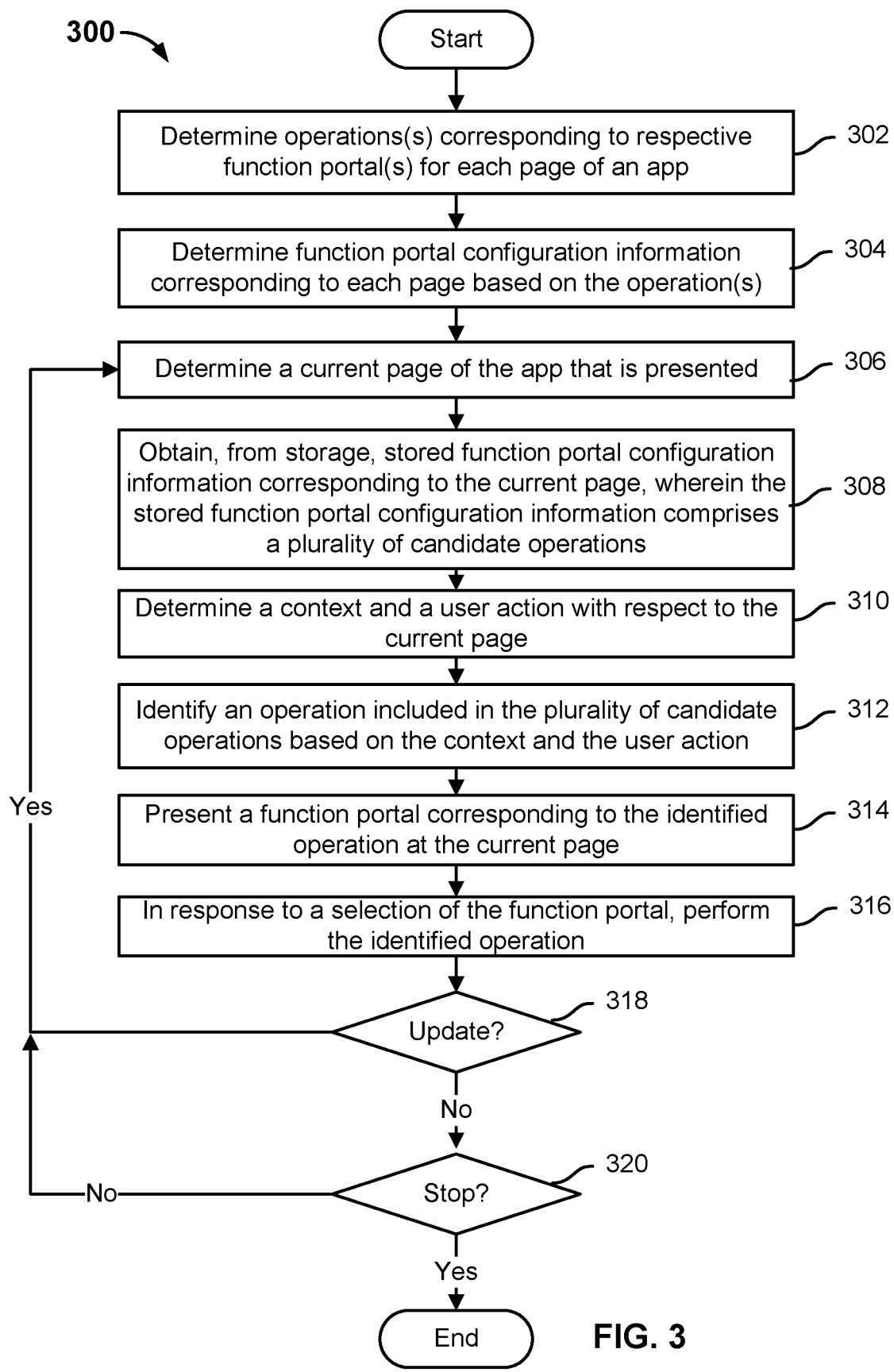
FIG. 3 is a flow diagram showing an embodiment of a process for dynamically presenting function portals.

FIG. 3 is a flow diagram showing an embodiment of a process for dynamically presenting function portals. In some embodiments, process 300 is implemented at device 100 of FIG. 1.

At 302, one or more operations corresponding to respective function portals are determined for each page in an application.

At 304, function portal configuration information corresponding to each page in the application is determined based at least in part on the one or more operations corresponding to respective function portals determined for that page.

Various types of applications may be installed on a smart terminal, and each application provides the user with needed information through its pages. For example, a calling application includes a contact directory page, a recent calls page, a dialing page, and a frequent contacts page. To give another example, a calendar application includes year, month, and date pages, and each page may record journal notes, memos, or other such information.

Therefore, for every application, it is possible to pre-configure operations corresponding to respective function portals for each page. In various embodiments, an operation corresponding to a function portal is determined according to the existing function(s) of the page. For example, an existing function may include a native operation at the page. For example, an application download page is configured with a download function. In some embodiments, the existing operations corresponding to every page of an application are merged to generate function configuration information for the application.

In some embodiments, an application may have multiple pages. To expedite user choice, native operations corresponding to different pages of the applications are determined in advance, and function portals corresponding to the different pages are configured based on the operations. In some embodiments, the different pages of the application are merged into a merged display page associated with the application and the corresponding operations associated with the different pages are merged together to generate function configuration information for the merged display page of the application. In some embodiments, multiple pages of an application may be merged into a single page based on an update to the computer code of the application. When multiple pages of one application are merged together to form a merged display page, each individual page that had been merged into the merged display page may now form a portion of the merged display page and may also be referred to as a "sub-page" of the merged display page. Then one or more operations for each sub-page are determined and all of the determined operations corresponding to the sub-pages of the merged display page are merged to generate function configuration information for the merged display page of the application.

Figure 4A:
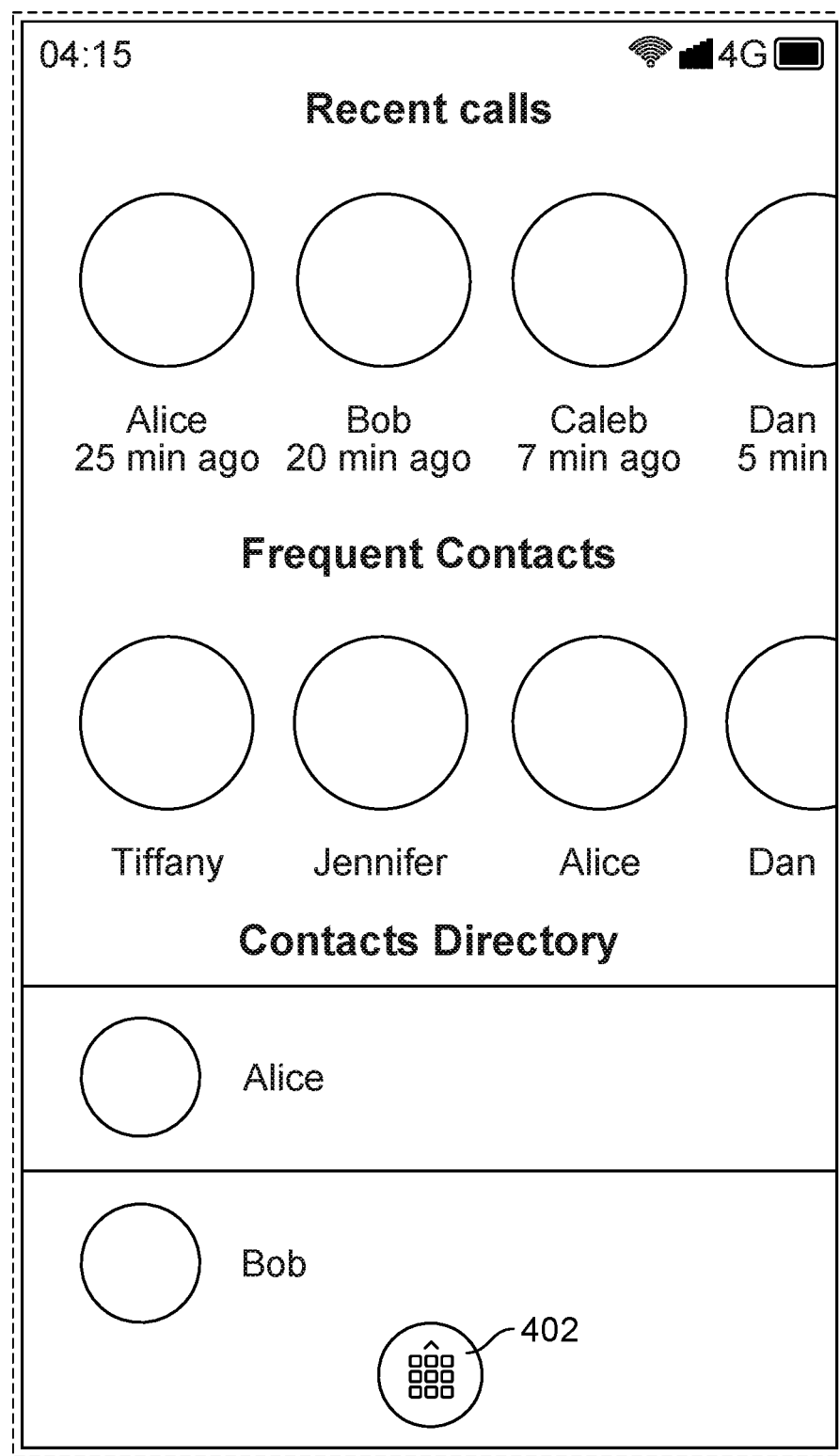
FIG. 4A shows an example merged display page of a calling application.
Figure 4B:
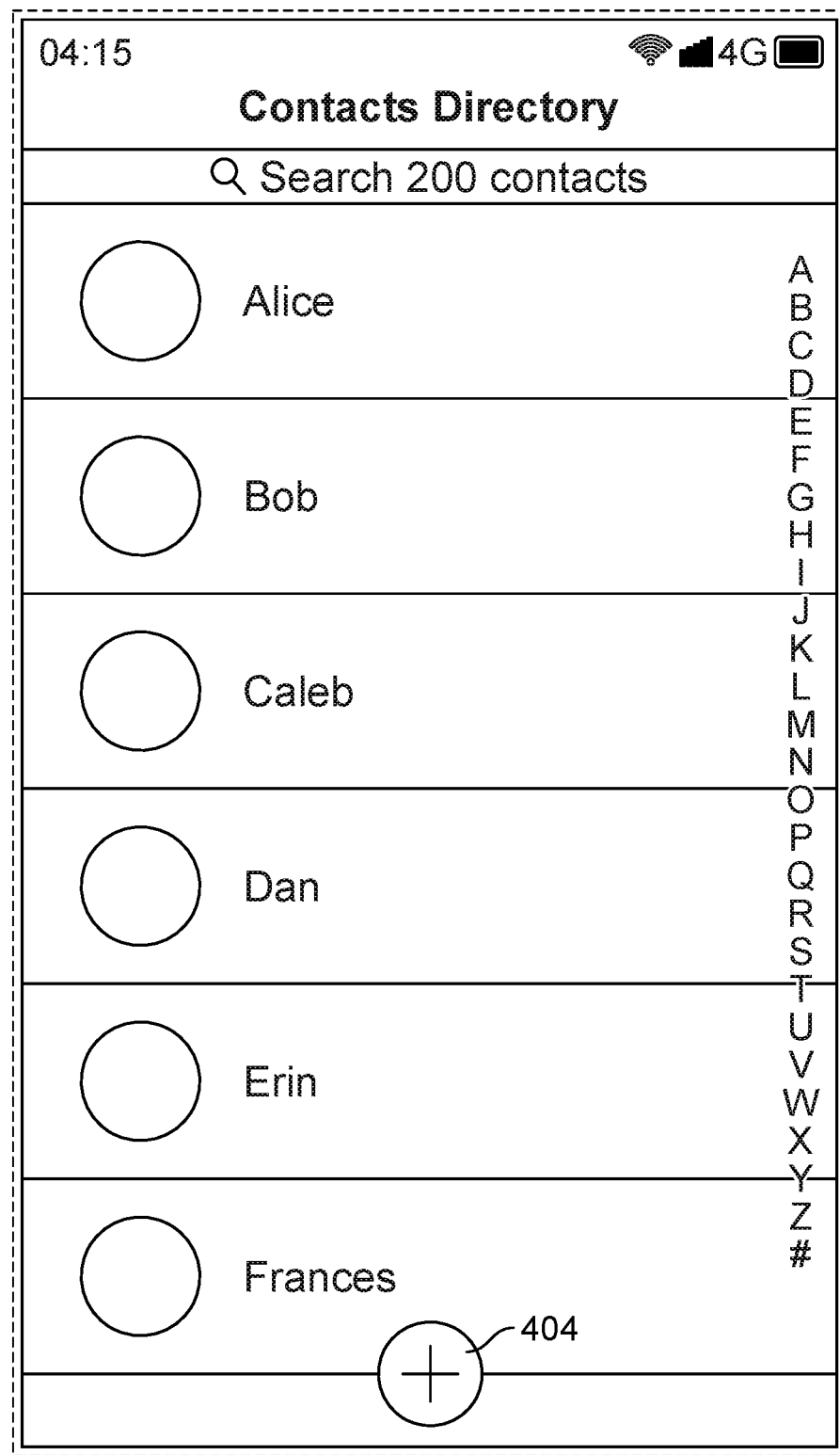
FIG. 4B shows an example contacts directory page of a calling application.
Figure 4C:
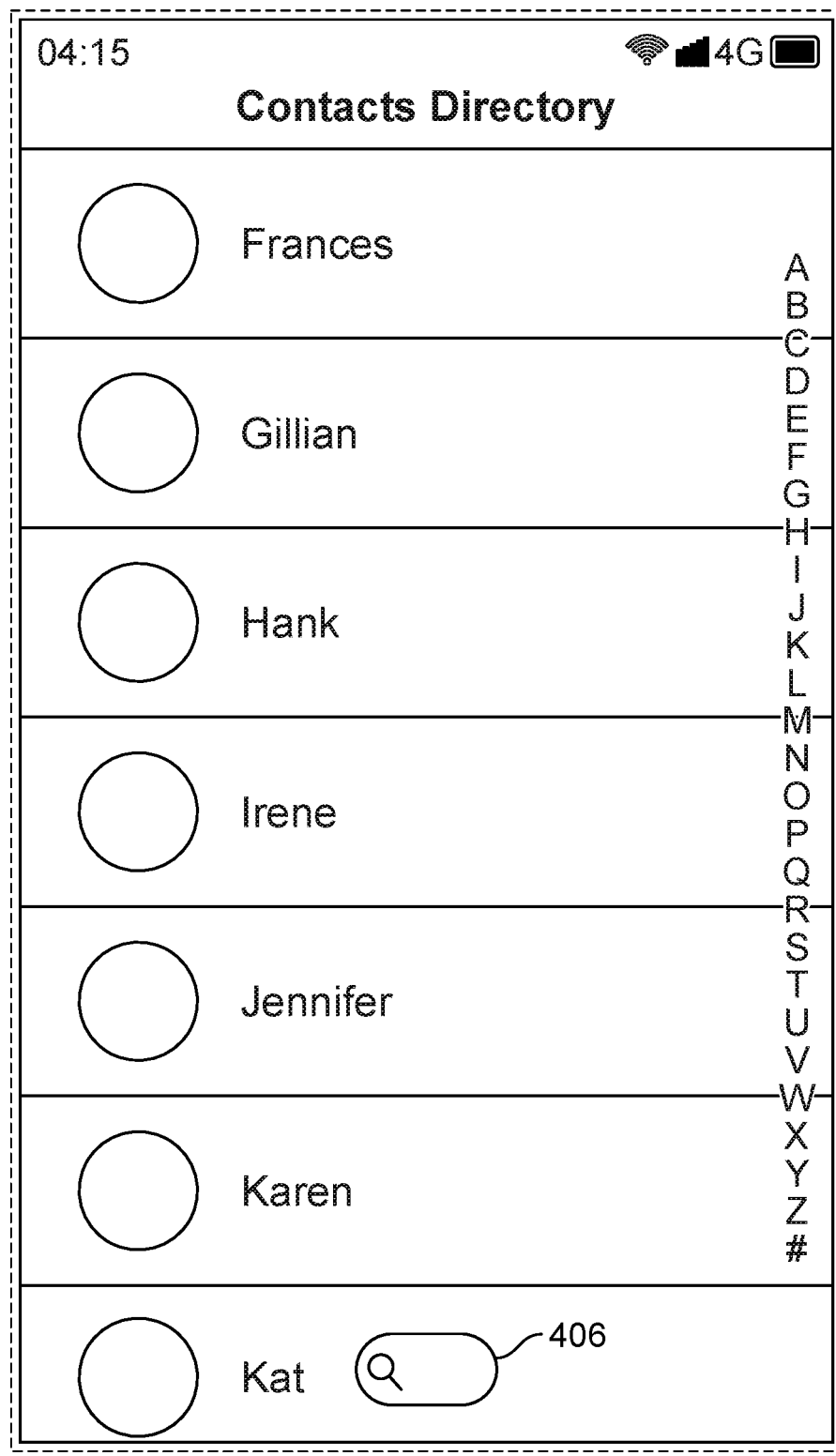
FIG. 4C shows an example contacts directory page of a calling application.

FIGS. 4A through 4C show example display screens of a calling application that presents a function portal in response to a user action and context with respect to a current page.

FIG. 4A shows an example merged display page of a calling application. Prior to merging several pages of the calling application into a single merged display page, the calling application included separate pages (e.g., where each page included corresponding one or more existing operations) including a contact directory page, a recent calls page, a dialing page, and a frequent contacts page. However, the pages were merged together into one merged display page, in which each sub-page (a contact directory page, a recent calls page, a dialing page, and a frequent contacts page) now forms a portion of the merged display page such that a user may scroll through the merged display page to access the operations related to each sub-page. Furthermore, the operation associated with each sub-page may be determined to have a corresponding function portal. Such operations and corresponding function portals are included in function configuration information for the merged display page. The function configuration information for the merged display page may also indicate rules for when certain function portals are to be displayed at the merged display page. For example, in response to the user action of scrolling down the merged display page and given the context that the operation(s) of a sub-page are not currently being presented within the display screen of the device, a function portal corresponding to that sub-page for which the corresponding operation is not within the display screen of the device may be presented. In the example of the merged display page that is shown in FIG. 4A, operations associated with the sub-pages of recent calls, frequent contacts, and contacts directory are displayed but the operations associated with the sub-page of dialing are not displayed and as such, function portal 402 that is displayed is the function portal corresponding to a dialing operation. In this way, FIG. 4A shows an example in which the operation(s) of different sub-pages of a merged display page may be accessed using function portals. Also, as shown in FIG. 4A, function portal 402 may float over the merged display page in the same location even if the user scrolls through different portions of the page.

FIG. 4B shows an example contacts directory page of a calling application that presents a function portal in response to a user action and context with respect to a current page. Unlike FIG. 4A, individual pages of the calling application are not merged together in this example. An operation for adding a new contact is configured in the function configuration information for this contacts directory page. As a user browses through the contacts by scrolling up and down the contacts directory page, based on a configured rule in the function configuration information corresponding to the calling application, the combination of that user action and the context of being at the contacts directory page may correspond to presenting function portal 404 that is associated with adding a new contact. If function portal 404 is selected, then the user is provided a form to input information regarding a new contact to add into the directory. In another example, if the user scrolls to the bottom of the contacts directory, using a configured rule in the function configuration information corresponding to the calling application, the combination of that user action and the context of the user having reached the bottom of the contacts directory page may correspond to presenting a function portal (not shown) associated with returning to the top of the contacts directory list.

FIG. 4C shows an example contacts directory page of a calling application that presents another function portal in response to another user action and context with respect to a current page. Unlike FIG. 4A, individual pages of the calling application are not merged together in this example. An operation for looking up contacts is configured in the function configuration information for this contacts directory page. As a user browses through the contacts by scrolling up and down the contacts directory page, based on a configured rule in the function configuration information corresponding to the calling application, the combination of that user action and the context of being at the contacts directory page may correspond to presenting function portal 406 that is associated with looking up a contact. If function portal 406 is selected, then the user is enabled to enter a string into function portal 406 to look up a contact whose name matches the string.

Thus, by using the configurations of all the function pages and function options of each application, the native operations of each application may serve as a basis to configure the corresponding function configuration information of the application, in some embodiments.

Returning to FIG. 3, at 306, a current page of the application that is presented is determined based on monitoring application activity at a device.

In various embodiments, an application activity monitoring process is executed at the device. The monitoring information may be communicated with each application. The running of applications at the device may be monitored and through the monitoring process, which application is currently executing (e.g., in the foreground) and which page of that application is currently being displayed at the display screen of the device are determined. For example, which application is currently executing (e.g., in the foreground) is determined by acquiring the application kit name using a relevant application programming interface (API). Then a page tag is obtained to determine the currently displayed page in the application that is currently executing (e.g., in the foreground).

At 308, stored function portal configuration information corresponding to the current page is obtained from storage, wherein the stored function portal configuration information comprises a plurality of candidate operations.

After the application that is currently executing and its corresponding page that is currently being displayed are determined, the stored function configuration information of the determined application may be obtained. As mentioned above, function configuration information corresponding to an application includes one or more candidate operations for which corresponding function portals may be presented at a page of the application.

At 310, a context with respect to the current page and a user action with respect to the current are determined.

As mentioned above, a context of a presentation of a current page includes, for example, the type of the application with which the current page is a part (e.g., utility, entertainment, productivity, etc.), one or more native operations that are included in the current page (e.g., native operations are determined based on the computer code that is used to implement the current page), and the portion of the current page that is currently visible at the display screen of the device (e.g., which native operations of the current page are actually accessible in the portion of the current page that is visible).

As mentioned above, a user action with respect to the current page is detected via the touchscreen or other input element of the device. For example, the detected user action may include, but is not limited to, opening a new page, a scrolling action (e.g., scrolling left and right or scrolling up and down), a clicking action (e.g., a single click or a double click), and a shaking action.

At 312, an operation is identified from the plurality of candidate operations based at least in part on the context and the user action.

In some embodiments, a set of rules that is included in the function configuration information corresponding to the application can be used to identify an operation from the candidate operations that are included in the function configuration information. For example, a rule could indicate that if user action X is detected and given that condition Y is satisfied by the context with respect to the presentation of the current page, candidate operation Z is identified. In some embodiments, analysis of the user action also considers the historical user action with respect to the current page. For example, the historical number of times that a user performs a user action at the current page is counted and the frequency count is used by the set of rules to identify a candidate operation. For example, a candidate operation may be identified, at least in part, based on whichever user action has occurred more frequently.

In some embodiments, a subset of the candidate operations can be first selected based on weighting the candidate operations using historical user actions and then choosing the subset of candidate operations based on their respective weights. Specifically, the weight of each candidate operation that is included in the function configuration information can be determined based on user historical operating information. User historical operation information may differ between different users. For example, user A may generally add memos in a calendar application while user B may generally view dates in the calendar application, e.g., user B may view holidays, the lunar calendar, and other such information at the calendar application. Therefore, it is possible to configure different function portals for different users on the same page. On each device, it is possible to collect user historical operating information from the actions taken by the user that uses that device with respect to each page of an application and then analyze that user's historical operating information (e.g., determine the number of times the user executed each operation on each page and other operating information such as duration of each user action) and thus determine the weight of each operation for each page of an application based on the collected user historical operating information. In some embodiments, a candidate operation's weight is stored in the function configuration information. For example, after a user enters the current page by clicking, scrolling, or some other action, all the candidate operations corresponding to that page may be determined from the function configuration information. Next, the weight of each candidate operation is looked up and the candidate operations are ranked according to their weights. Then the N candidate operations with the greatest weights are determined as the selected subset of candidate operations from which one will be identified using the set of rules included in the function configuration information. The function portal corresponding to the identified operation will be presented at the current page.

A user may execute necessary actions, such as scrolling up or down to look up a contact, an application, or mail, on the current page. Thus, the user action, combined with the context with respect to the presentation of the current page, determines the function portal configured to correspond to the operation. In some embodiments, user intention information is analyzed based on the user action and the context with respect to the presentation of the current page and the rules included in the configuration information are used to identify a corresponding candidate operation. When viewing information on a page, the user often scrolls up or down. Therefore, page display content is currently being adjusted using analysis of the up/down scrolling action. Thus, it is determined that the user who is executing a viewing action may intend to look up something. When scrolling left or right across a page, a user is often switching pages. Therefore, analysis of a left/right scrolling action and the presented pages determines that the page display is currently being adjusted. The determination may be made that the user intends to switch pages. When entering a page that has a native operation, the user will often execute the native operation of that page. Therefore, analysis may find that the user intends to execute that native function. Therefore, by analyzing user actions and the current context of a current page, it is possible to ascertain the changes caused by a user action to an application or to a page in an application, i.e., to determine application change information corresponding to the user action, and thus to determine user intention information based on application change information, e.g., a look-up intention corresponding to a change in page content, a switch intention corresponding to page switching (such as returning to a previous page or viewing the next page), or an intention to execute a native function corresponding to entering another predetermined page.

For example, analysis of up/down scrolling in a contacts directory page or a mail inbox page indicates that the user may be looking up a contact or mail. Thus, the user intention information is to perform a "look up" of an item that may be included in that page (e.g., a specific contact or a specific email). To give another example, the user clicks to enter an application introduction page in an application center. Analysis indicates that the user may be going to download the application. Thus, the user intention information is to "download" an application. The function configuration information includes each candidate operation corresponding to each page and the user intention information is matched with the function configuration information using the rules included in the function configuration information to determine the operation matched with the user intention information. For example, a rule may dictate that a look-up intention corresponds to a looking up or searching operation, providing that the context with respect to the presentation of the current page indicates that a native looking up or searching operation is not currently visible at the display screen of the device. Then the function portal corresponding to the looking up/searching operation is identified and the function portal corresponding to the identified looking up/searching operation is presented at the current page.

At 314, a function portal corresponding to the identified operation is presented at the current page.

As mentioned above, the function portal may be presented as a control or button at the current page. The function portal may be presented in a manner that overlays the current page at a static position on the display screen so that the function portal can be seen even if the current page is scrolled through.

At 316, in response to a selection of the function portal, the identified operation is performed at the current page.

Once a user selects the function portal (e.g., by touching the function portal and/or inputting information into the function portal), the operation corresponding to the function portal is performed (e.g., based on the input information, if appropriate). For example, if the function portal corresponds to an operation associated with returning to the top of the current page, then once the function portal is selected, the top of the current page will be displayed at the display screen of the device. In another example, if the function portal corresponds to an operation associated with performing a search (e.g., locally or via a remote search source), the user input value will be used as the search query to perform the search and the found search results are presented at the device. In yet another example, if the function portal corresponds to an operation associated with adding a new calendar event, the selection of the function portal would cause a form to appear that would enable the user to input information regarding a new calendar event.

At 318, it is determined whether an update in the context and/or the user action has occurred. In the event that an update in the context and/or the user action has occurred, control is returned to 306. Otherwise, in the event that an update in the context and/or the user action has not occurred, control is transferred to 320.

It is determined whether the context with respect to the presentation of the current page and/or the user action has been updated. For example, the context may be updated as the user scrolls through the current page and causes a different portion of the current page (and the native operations thereof) to be displayed within the display screen of the device. The context may also be updated if the user switches to a different page associated with the same application or a different application. For example, the user action may be updated if the user performs a different user action and/or a new instance of the same user action. If an update in the context, the user action, or both has occurred, then control is returned to 306 to determine whether a new function portal corresponding to a different identified operation is to be presented based on the updated context and/or user action. As such, in response to changes in the context and/or user action changes with respect to the current page, new function portals can be dynamically presented to accommodate the user's experience of utilizing the application.

At 320, it is determined whether the process is to be stopped.

For example, the process may be determined to be stopped if the device is turned off and/or all applications are closed at the device.

As mentioned above, in some embodiments, existing functions (which may include native operations) that are included in pages of an application are determined in advance (e.g., of executing the application at a device or during development time of the application). Such operations may be included as candidate operations corresponding to respective function portals. The candidate operations and their respective function portals, along with rules for which the combination of user action and context with respect to a presentation of a page of the application should cause a certain function portal of a corresponding operation to be presented at the page, are included in a set of function configuration information for the application. The set of function configuration information corresponding to one or more applications may be stored local to a device at which the applications are installed.

FIGS. 5A through 5F show example display screens at a device for various pages of an application management center application.

Figure 5A:
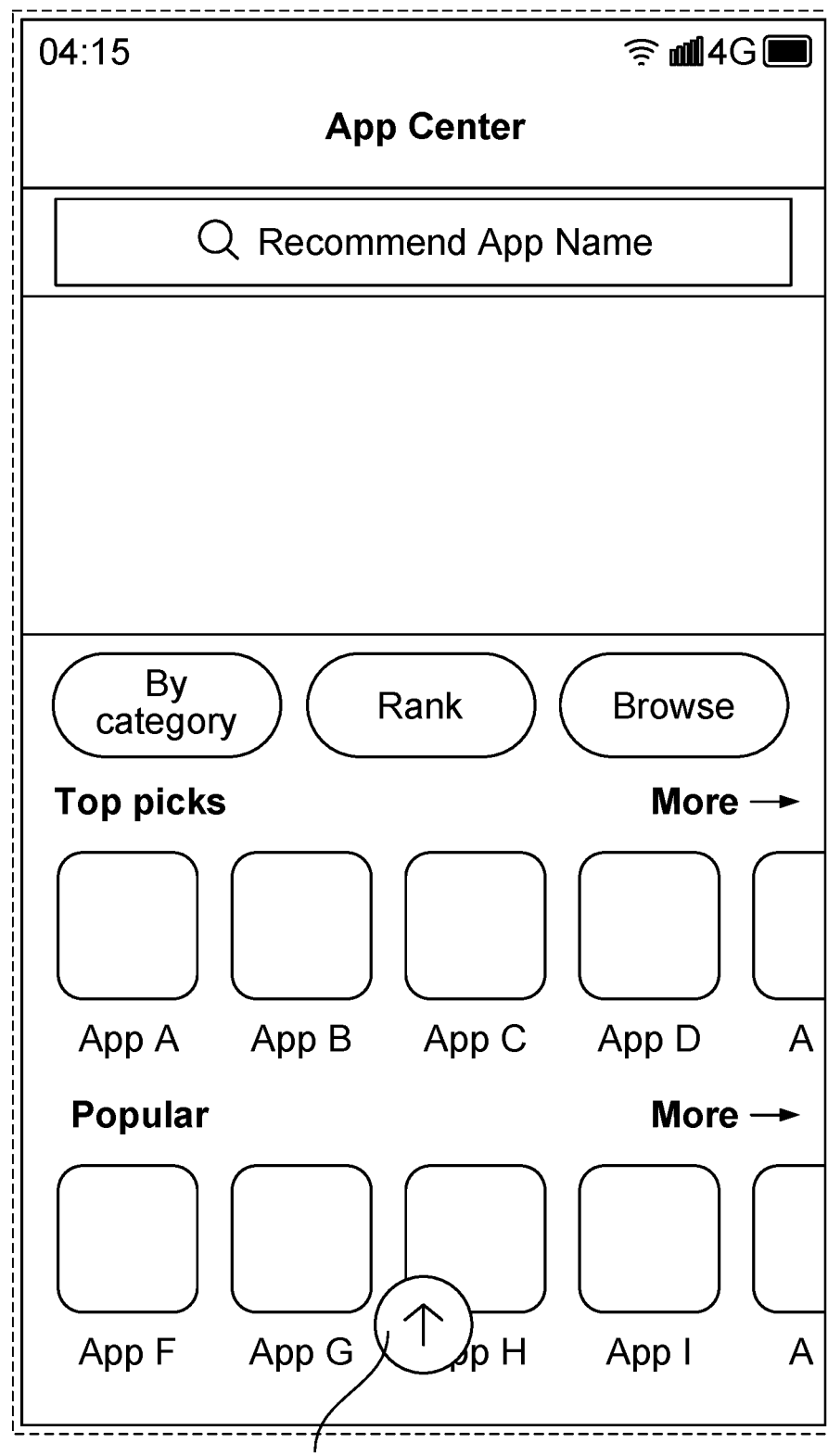
FIG. 5A shows an example page of the application management center application that shows various applications that are available for download to the device.
Figure 5B:
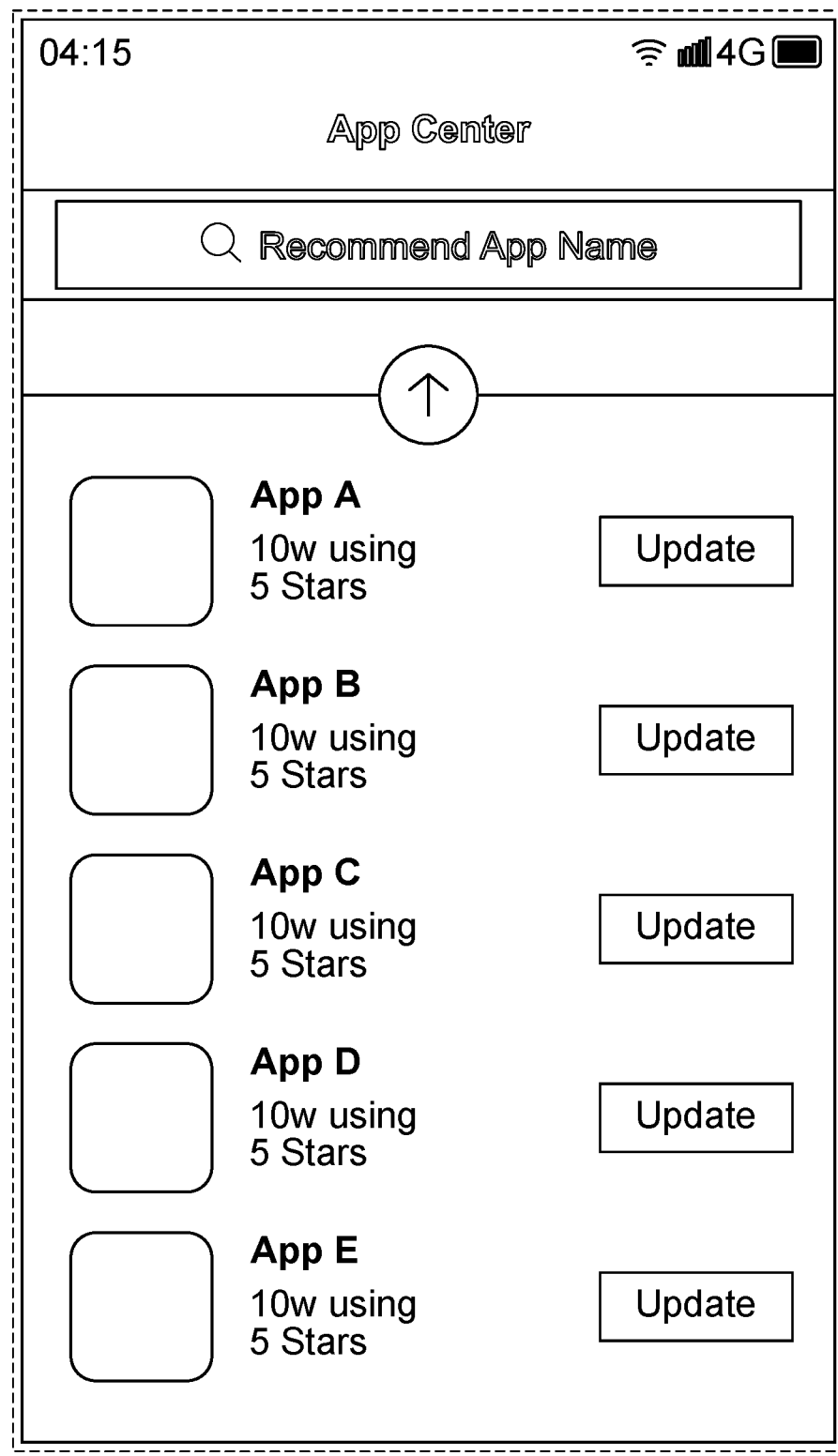
FIG. 5B shows an example of a page of the application management center application that presents various applications that are already installed at the device and for which software updates are available.
Figure 5C:
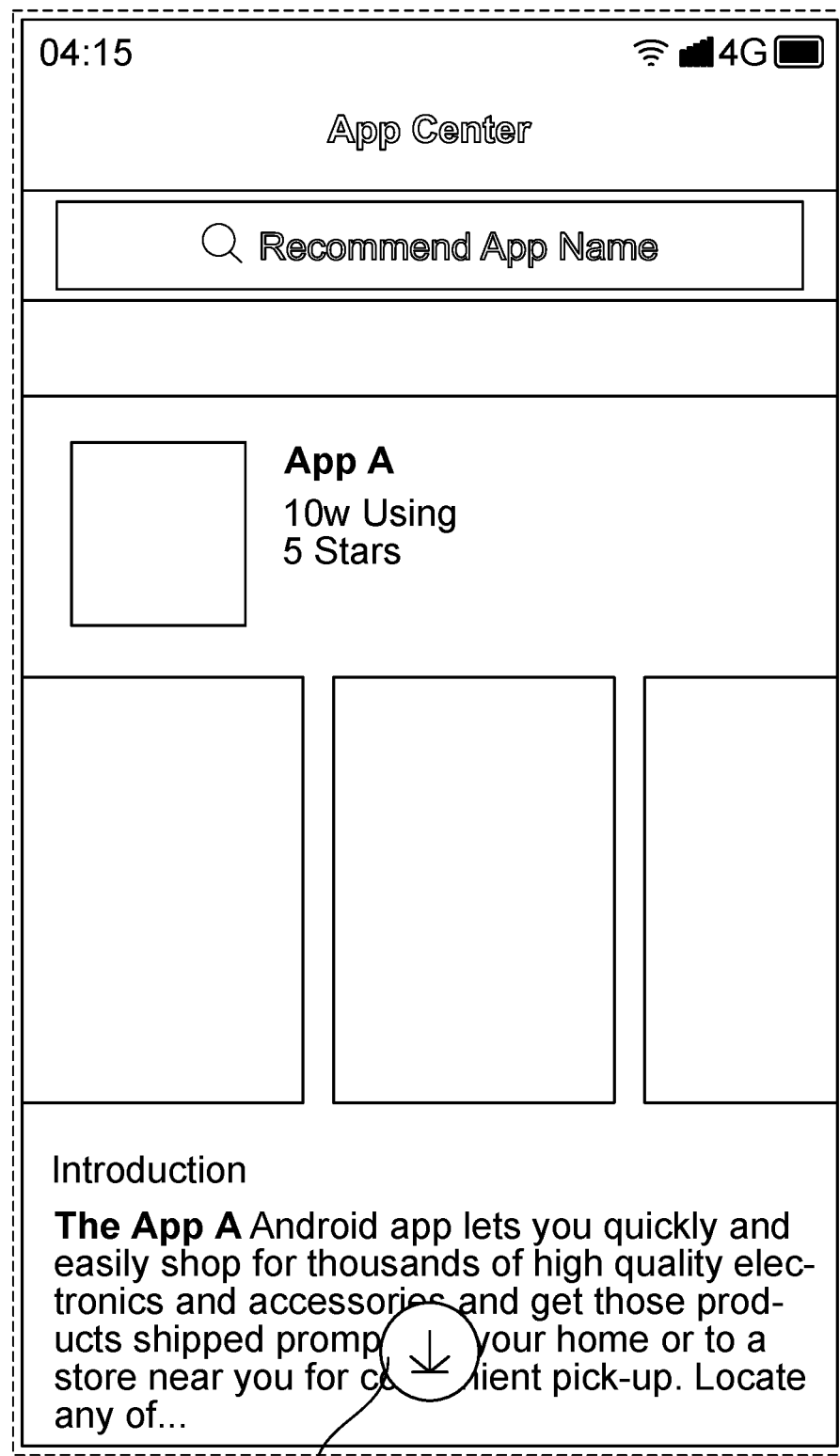
FIG. 5C shows an example application profile page of the application management center application.

FIG. 5A shows an example page of the application management center application that shows various applications that are available for download to the device. The portion of the application management center application includes a native search bar to search (which is labeled "Recommended App Name") for an application as well as categories (e.g., top picks, popular) of applications to download. Based on the current context of the presentation of the page and the user action (e.g., user scrolling down the page), function portal 502 associated with accessing an application update page is presented. In response to a user selection of function portal 502, an application page is presented at the display screen. FIG. 5B shows an example of a page of the application management center application that presents various applications that are already installed at the device and for which software updates are available. The user can select any of the applications that are indicated at the display screen of FIG. 5B to download and install an update to them. Returning to FIG. 5A, in response to a user selection of an application that is presented at the page of the application management center application for downloading, a profile page related to that application may be presented. FIG. 5C shows an example application profile page of the application management center application. For example, the page of FIG. 5C can be presented at the device in response to a user selection of Application A at the page of the application management center application for downloading (as shown in FIG. 5A). The application profile page for Application A includes function portal 506 corresponding to the operation of downloading Application A to the device. For example, function portal 506 was determined based on the user action of selecting to download Application A and also the context of a native download button/control currently being out of the display area of the device.

Figure 5D:
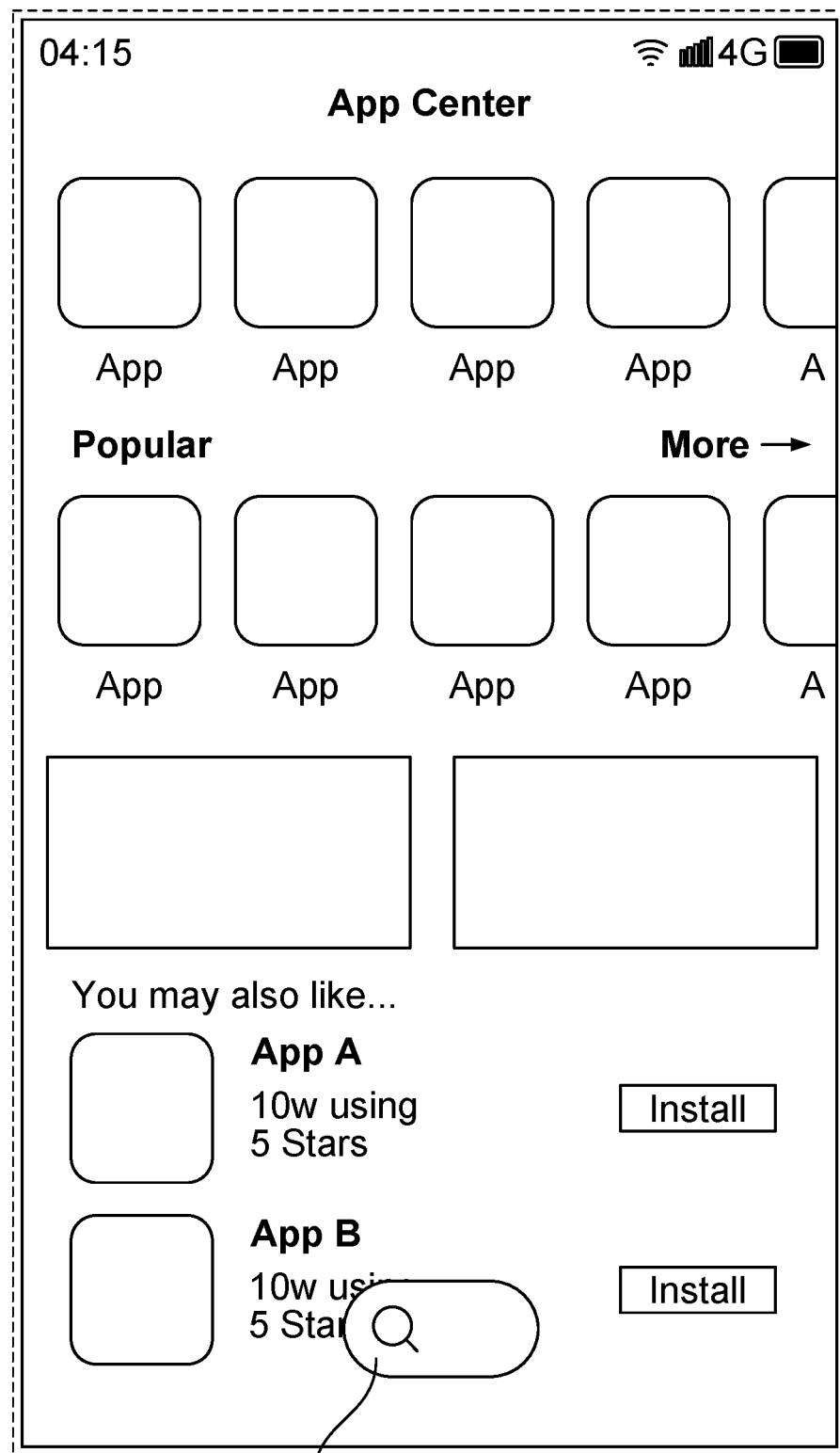
FIG. 5D is a diagram showing an example page of the application management center application that shows various applications that are available for download to the device.
Figure 5E:
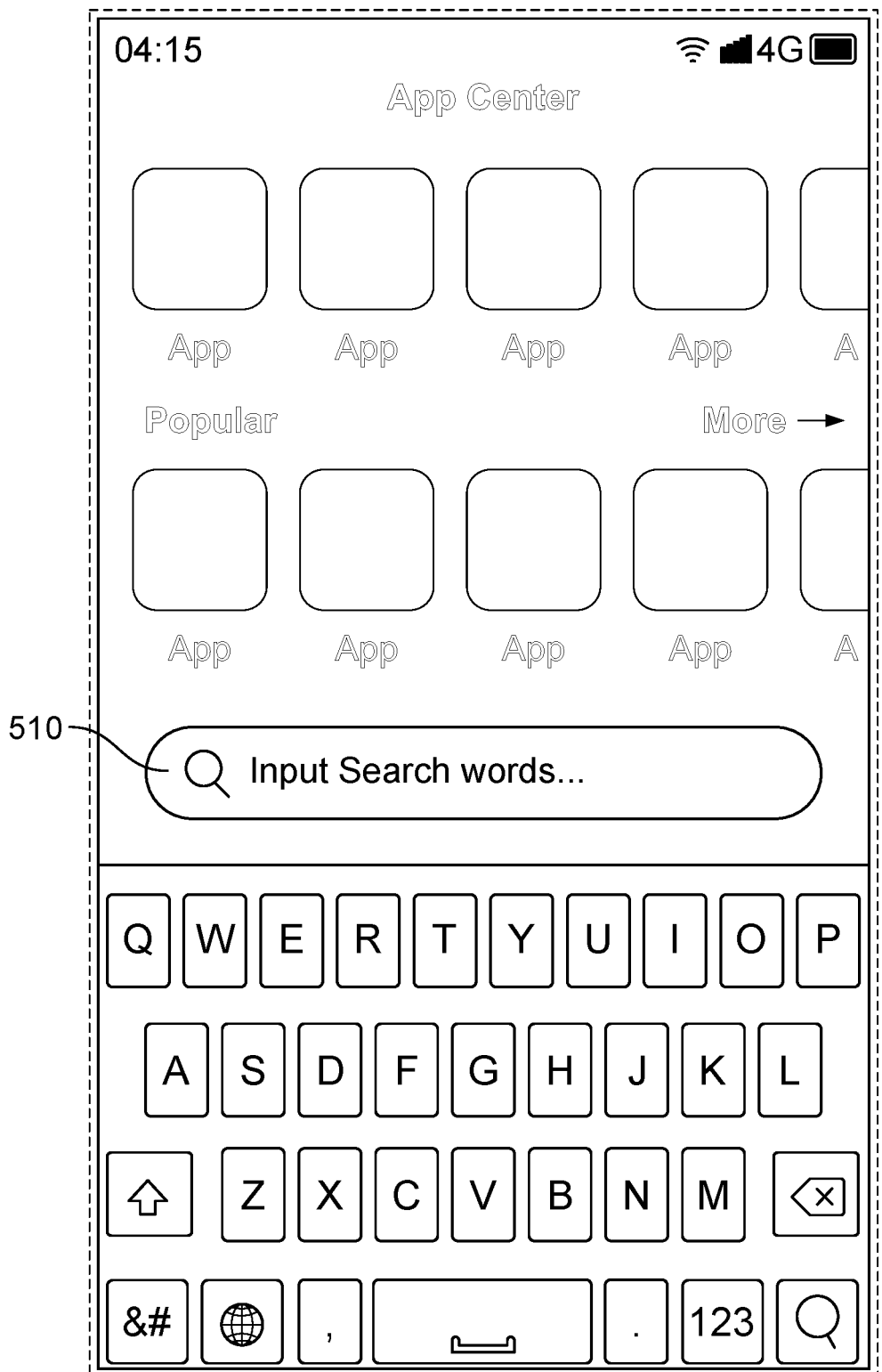
FIG. 5E is a diagram showing a page that includes a larger version of an input field associated with a searching operation corresponding to a user selected function portal.
Figure 5F:
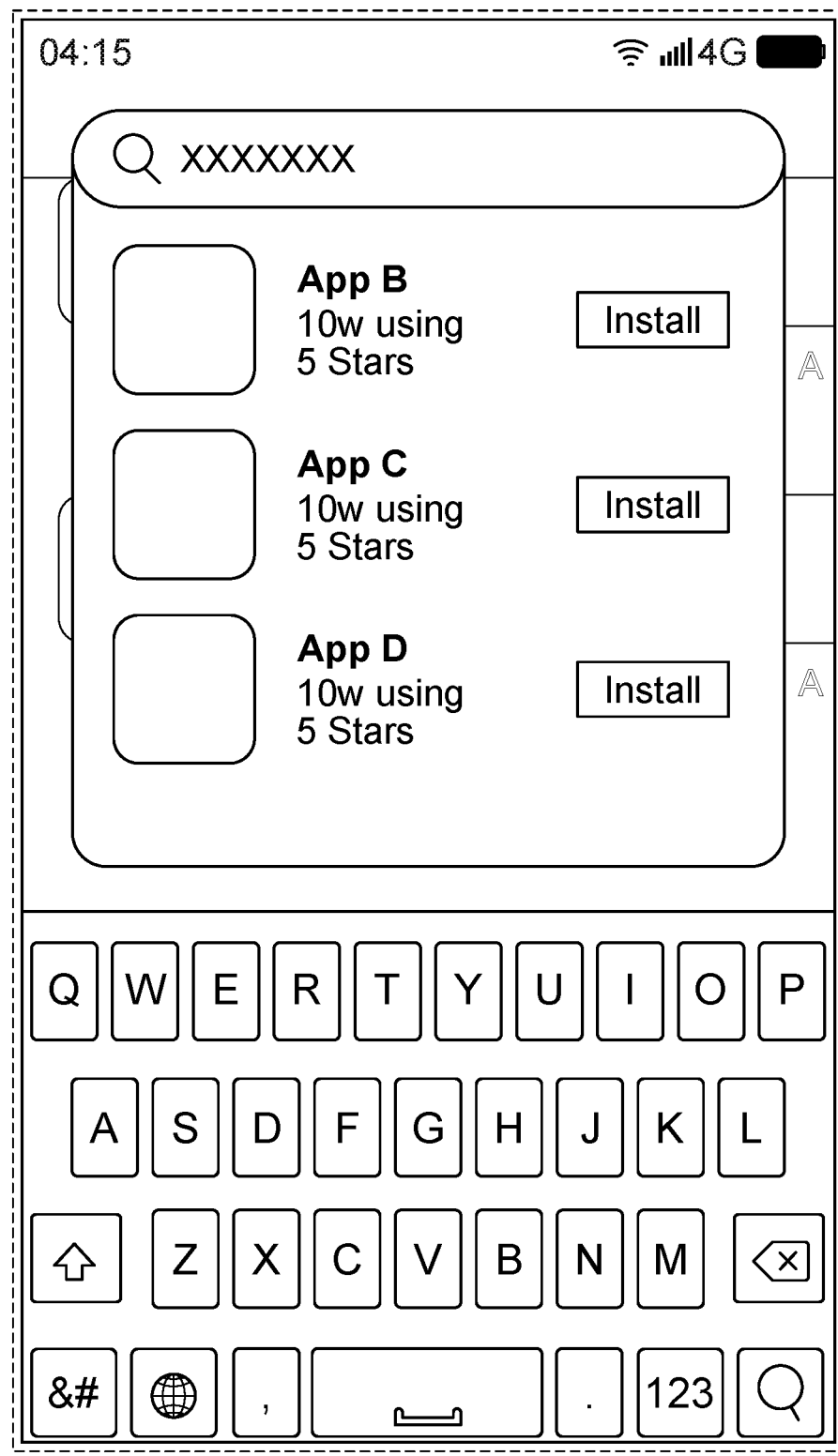
FIG. 5F is a diagram showing a page that presents search results that match the input text or other values that are input into a search bar.

FIG. 5D is a diagram showing an example page of the application management center application that shows various applications that are available for download to the device. In the example of FIG. 5D, function portal 508 associated with searching for an application is presented. In response to a user input of a string or other value in the input field of function portal 508, a search of applications that are available for download is performed based on the user input string. Compared to the presentation of the same page in FIG. 5A, in FIG. 5D, it appears that the user has navigated (e.g., scrolled) further down on the same page. As a result of the user's navigation (e.g., downward scrolling), the native search bar to search (which is labeled "Recommended App Name") in the page that was shown in FIG. 5A is no longer visible in the presentation of the same page in FIG. 5D. As a result, the context with respect to the presentation of the page has changed and the updated context in combination with a user action (e.g., scrolling downwards) at the page was matched to function portal 508 using rules included in the function configuration information corresponding to the application management center application. For example, the relevant rule indicated that if the user action is scrolling up or down and given the context that a native search bar is not shown at the display area of the device, then the function portal corresponding to the search operation should be presented at the current page. As such, as the context of the current page changes (e.g., certain native operations of the page are obscured out of the display area of the device), the function portal that is presented at the current page is dynamically updated based on the updated context and/or user action. In some embodiments, in response to a user selection of function portal 508 of FIG. 5D and prior to a user input of a string or other value in the input field of function portal 508, a new page is presented with a larger version of an input field associated with a searching operation to make it more convenient for the user to input information into the input field. FIG. 5E is a diagram showing a page that includes a larger version of an input field associated with a searching operation corresponding to a user selected function portal. For example, after a user selects function portal 508 of FIG. 5D, the page of FIG. 5E is presented at the display screen of the device. The page of FIG. 5E includes not only a larger search field but also a keyboard for the user to input text or other values into the search bar. After a search is conducted based on the user input into the search bar (510), a new page is presented with search results that match the input text or other values. FIG. 5F is a diagram showing a page that presents search results that match the input text or other values that are input into a search bar. For example, FIG. 5F could be showing a page with applications that form the search results to a search conducted on available applications for download using text or other values that were input into the search bar shown in FIG. 5D.

Figure 6A:
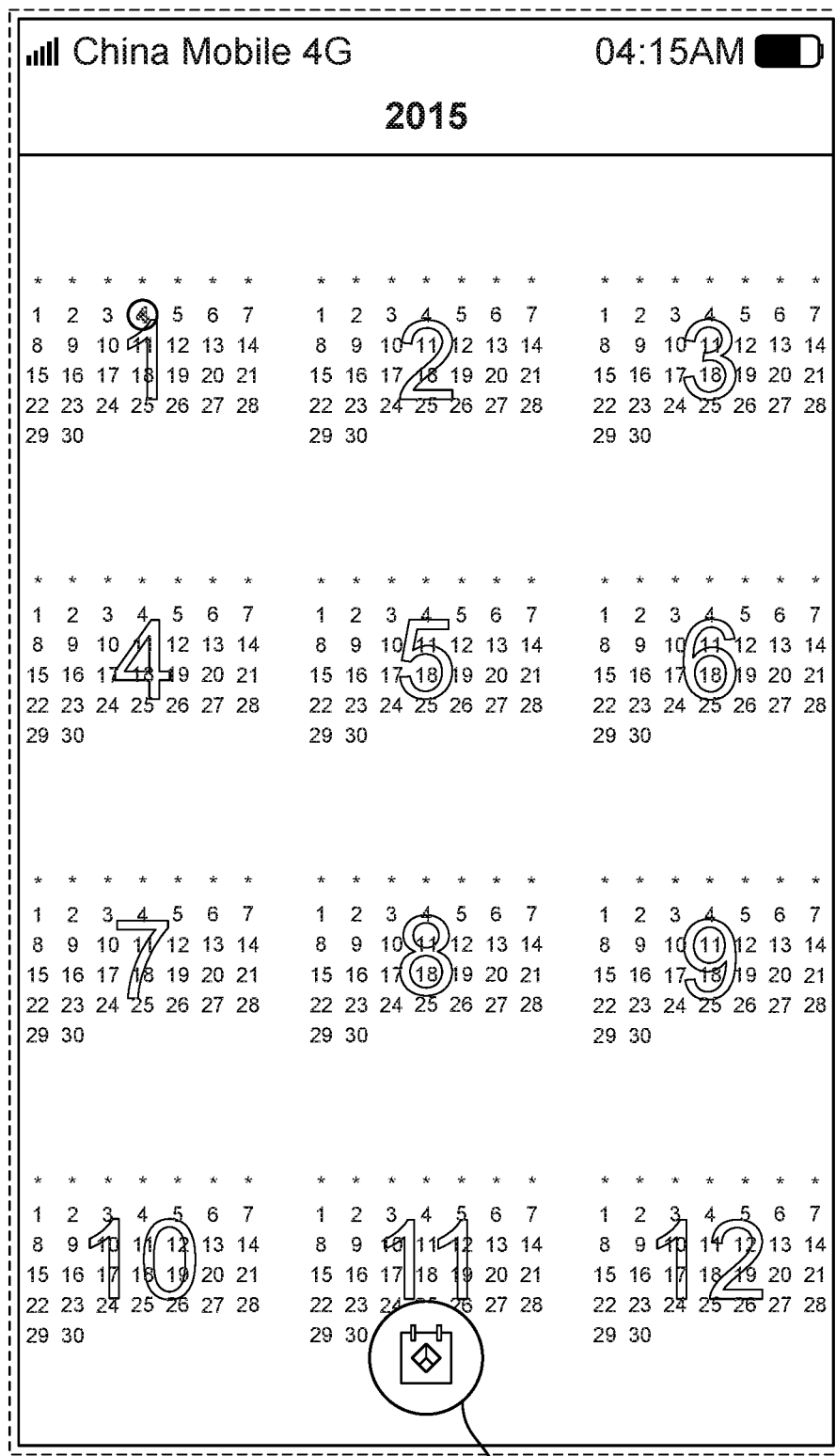
FIG. 6A is a diagram showing a page of a calendar application that shows the calendar of an entire year (12 months).
Figure 6B:
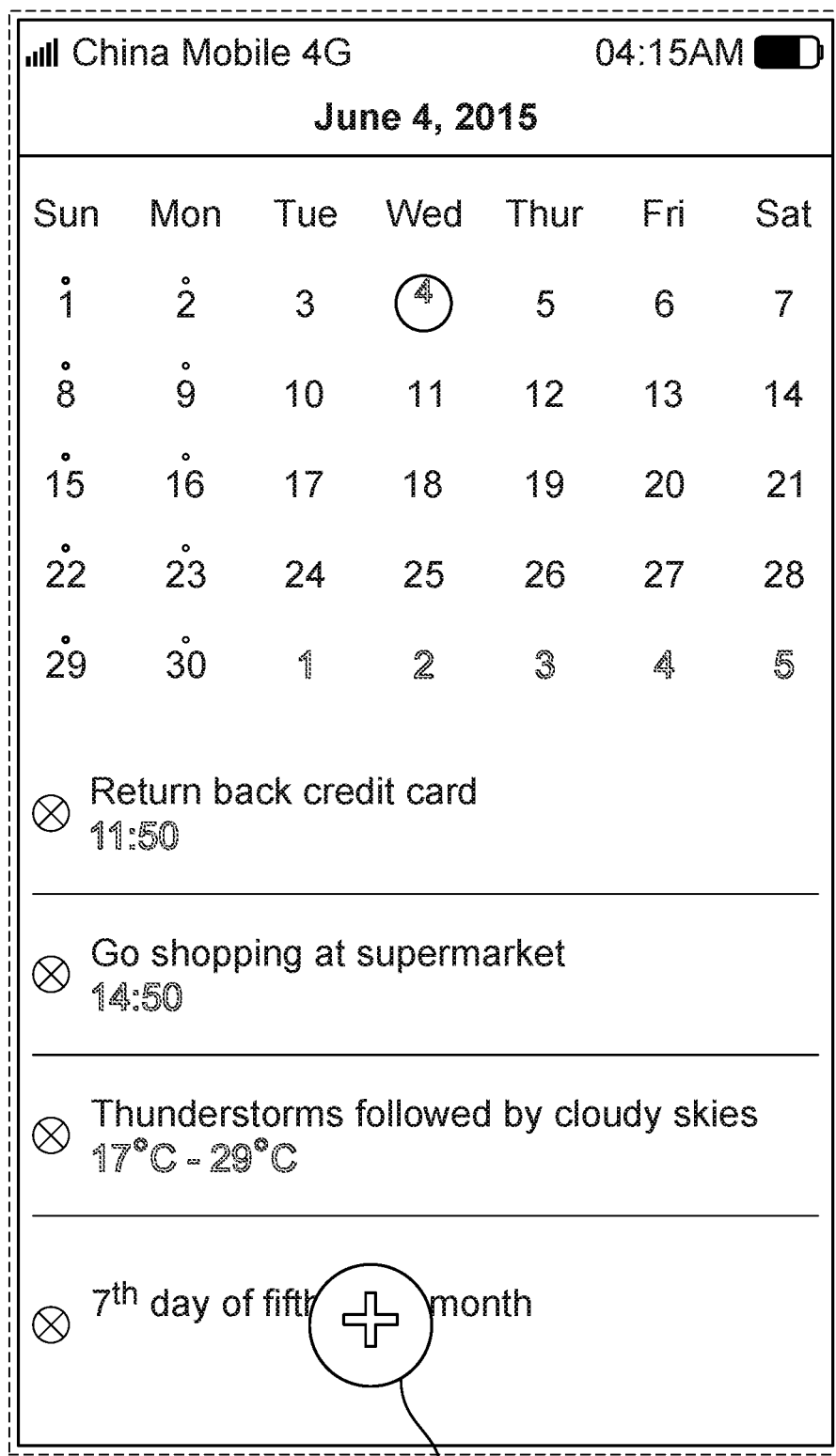
FIG. 6B is a diagram showing memorandums that have been configured for a selected date and its corresponding month.
Figure 6C:
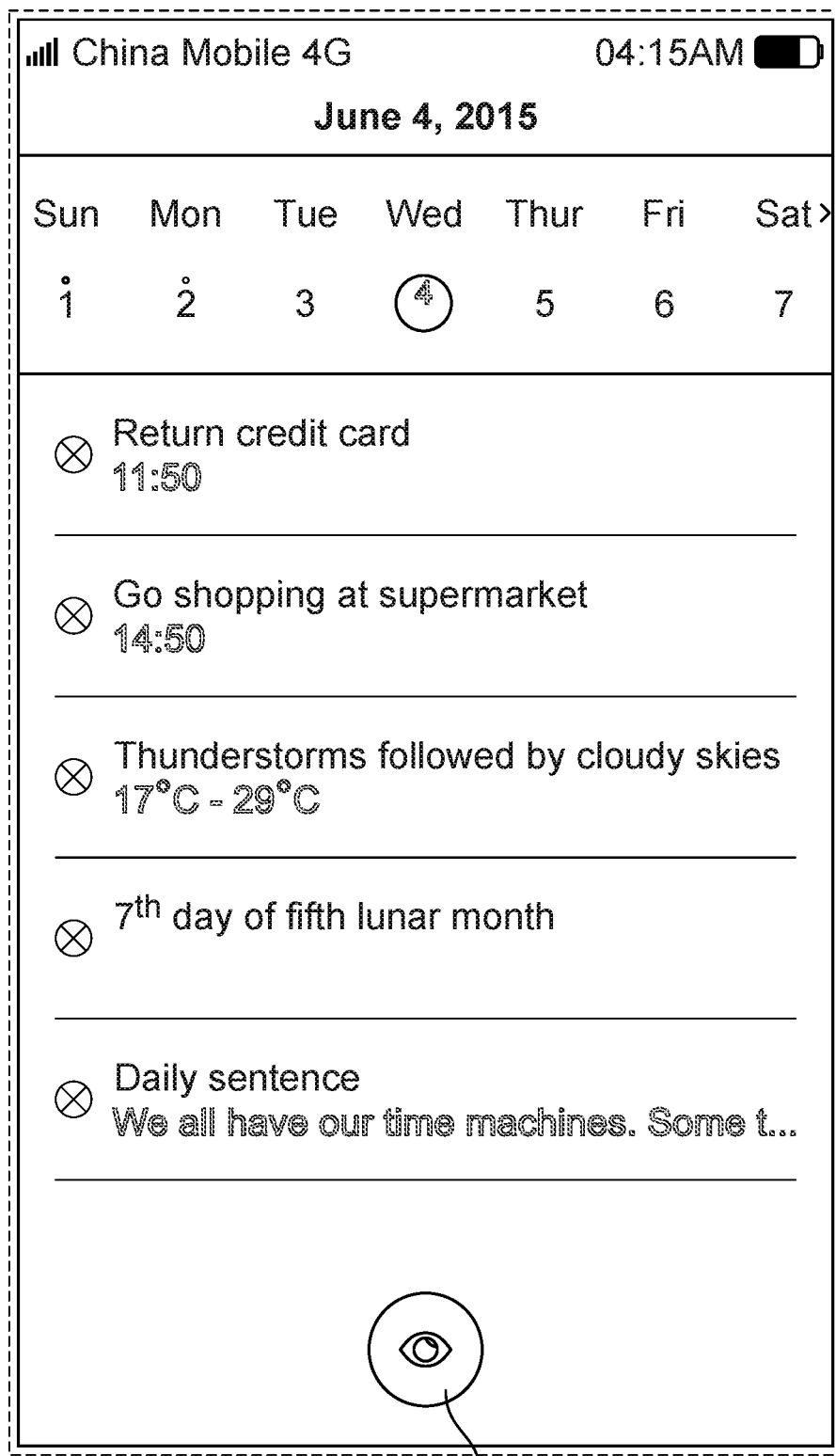
FIG. 6C is a diagram showing a page of a calendar application for viewing only the memorandums associated with a selected date.

FIGS. 6A through 6C show example display screens at a device for various pages of a calendar application.

FIG. 6A is a diagram showing a page of a calendar application that shows the calendar of an entire year (12 months). Function portal 602 corresponding to selecting a date of the year is presented at the page of FIG. 6A. For example, function portal 602 is presented based on a combination of the current context with respect to the presentation of the page and a user action (e.g., the user initiating the display of the page) using the rules included in the stored function configuration information corresponding to the calendar application. In response to a selection of function portal 602, a user interface with respect to selecting a particular date is presented (not shown). After the user selects a particular date within the user interface, a page associated with viewing memorandums related to the selected date may be presented. FIG. 6B is a diagram showing memorandums that have been configured for a selected date and its corresponding month. In FIG. 6B, the date, Jun. 4, 2015, has been selected and memorandums that have been configured for that date are presented (e.g., "Return back credit card" at 11:50, "Go shopping at supermarket" at 14:50) among other information related to that date (e.g., the weather forecast, a corresponding date in the lunar calendar). Function portal 604 corresponding to configuring a new memorandum for the date associated with the current page is presented at the page of FIG. 6B. For example, function portal 604 is presented based on a combination of the current context with respect to the presentation of the page and a user action (e.g., the user initiating the display of the page) using the rules included in the stored function configuration information corresponding to the calendar application. FIG. 6C is a diagram showing a page of a calendar application for viewing only the memorandums associated with a selected date. Unlike FIG. 6B, the page of FIG. 6C focuses only on a particular selected date and not the month in which it is included. Function portal 606 corresponding to viewing the details associated with a particular memorandum (e.g., return credit card, go shopping at supermarket, etc.) that is configured for the date associated with the current page is presented at the page of FIG. 6C. For example, function portal 606 is presented based on a combination of the current context with respect to the presentation of the page and a user action (e.g., the user initiating the display of the page) using the rules included in the stored function configuration information corresponding to the calendar application.

Figure 7A:
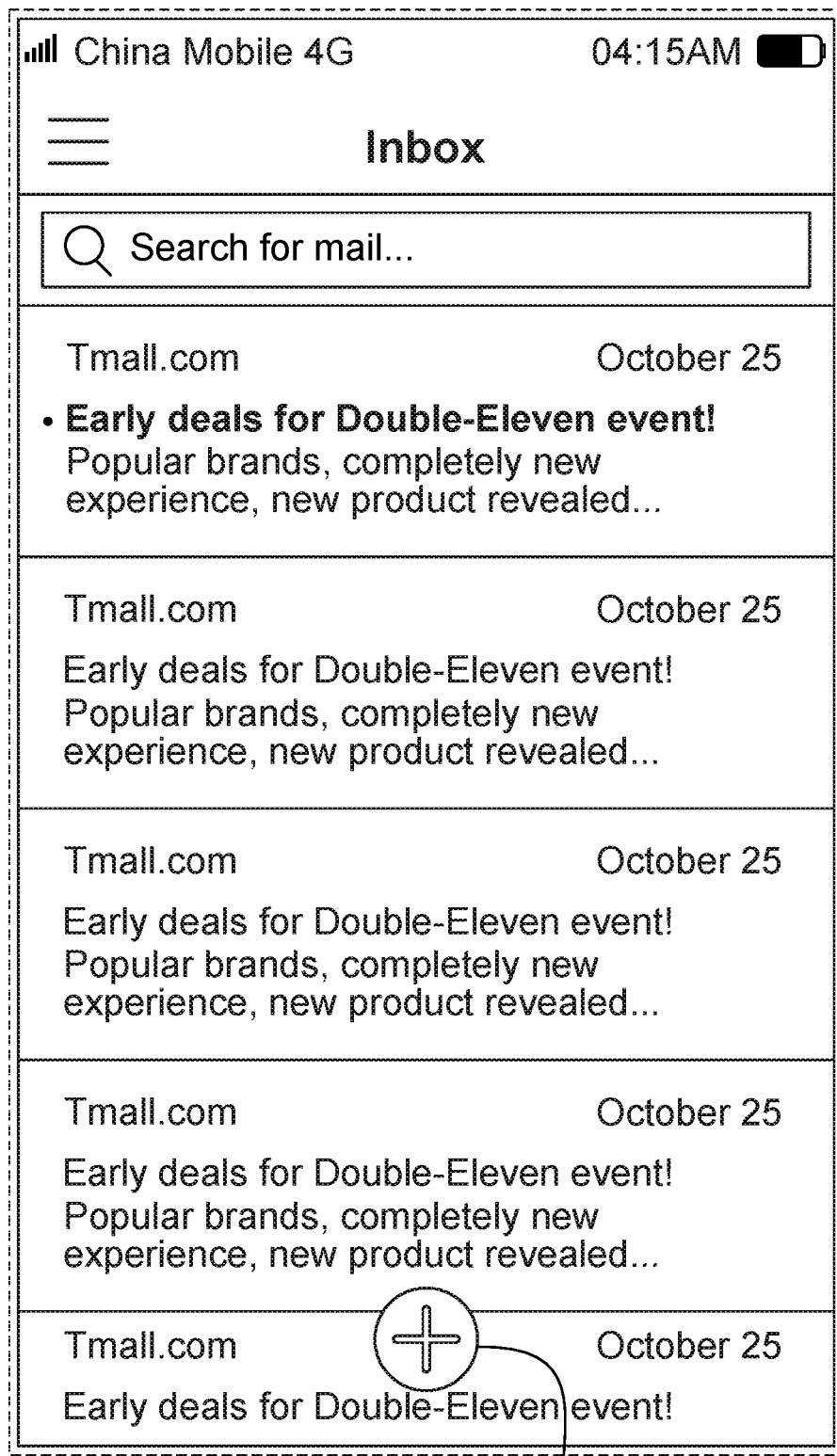
FIG. 7A is a diagram showing a page of a mail application that shows an inbox.
Figure 7B:
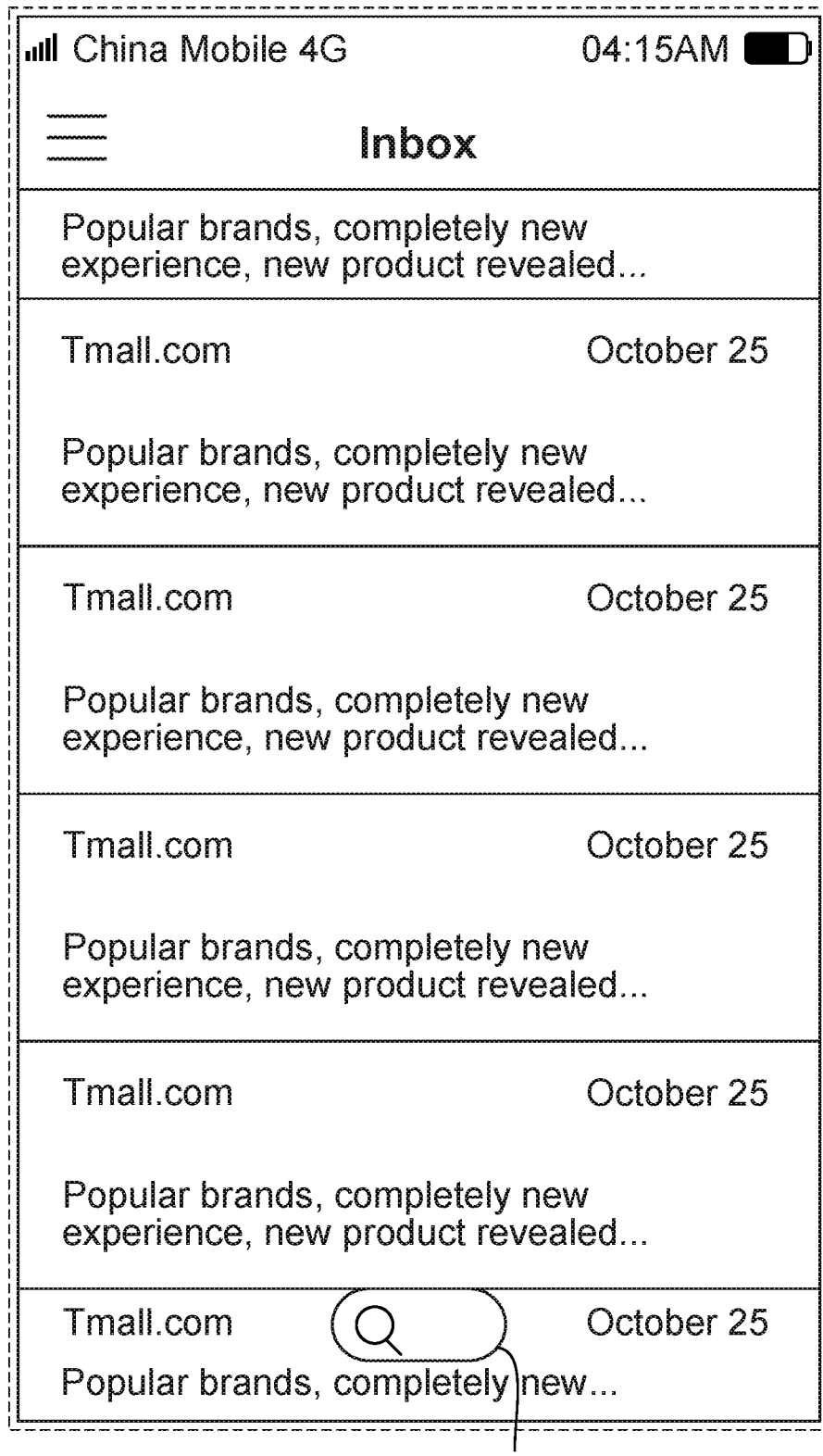
FIG. 7B is a diagram showing a page of a mail application that shows an inbox.
Figure 7C:
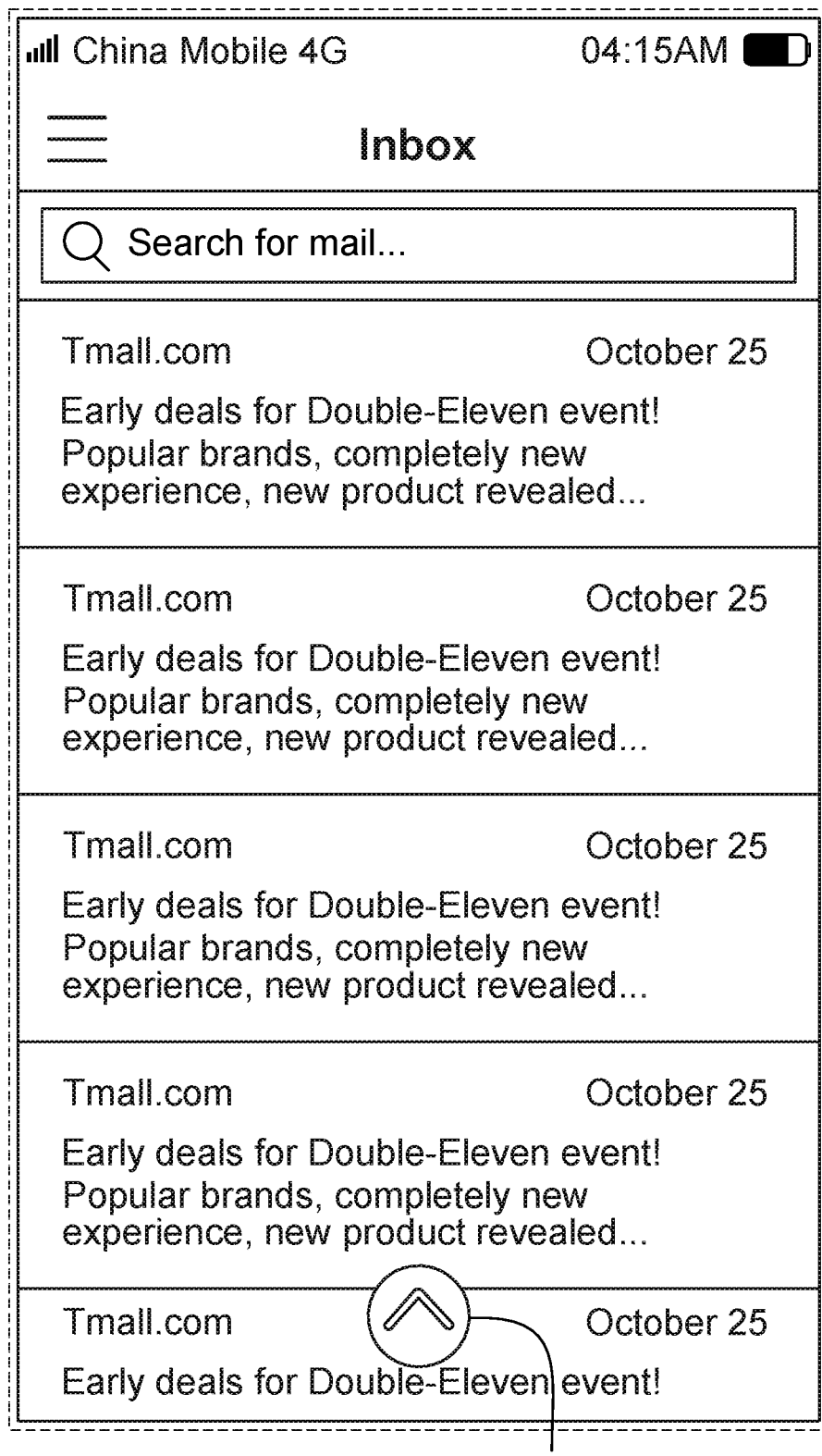
FIG. 7C is a diagram showing a page of a mail application that shows an inbox.

FIGS. 7A through 7C show example display screens at a device for various pages of an email application.

FIG. 7A is a diagram showing a page of a mail application that shows an inbox. The inbox page shown in FIG. 7A also includes a native search bar (labeled "Search for mail . . . ") at the top of the page. Function portal 702 corresponding to composing a new email is presented at the page of FIG. 7A. For example, function portal 702 is presented based on a combination of the current context with respect to the presentation of the page and a user action (e.g., the user initiating the display of the page) using the rules included in the stored function configuration information corresponding to the mail application. In response to a selection of function portal 702, a user interface with respect to composing a new email may be presented (not shown). FIG. 7B is a diagram showing a page of a mail application that shows an inbox. Function portal 704 corresponding to searching through the inbox is presented at the page of FIG. 7B. Compared to the presentation of the same page in FIG. 7A, in FIG. 7B, it appears that the user has navigated (e.g., scrolled) further down on the same page. As a result of the user's navigation (e.g., downward scrolling), the native search bar to search (which is labeled "Search for mail . . . ") in the page that was shown in FIG. 7A is no longer visible in the presentation of the same page in FIG. 7B. As a result, the context with respect to the presentation of the page has changed and the updated context in combination with a user action (e.g., scrolling downwards) at the page was matched to function portal 704 using rules included in the function configuration information corresponding to the mail application. For example, the relevant rule indicated that if the user action is scrolling up or down and given the context that a native search bar is not shown at the display area of the device, then the function portal corresponding to the search operation should be presented at the current page. As such, as the context of the current page changes (e.g., certain native operations of the page are obscured out of the display area of the device), the function portal that is presented at the current page is dynamically updated based on the updated context and/or user action. FIG. 7C is a diagram showing a page of a mail application that shows an inbox. Similar to FIG. 7A, the page of FIG. 7C shows the native search bar (labeled "Search for mail . . . "). Function portal 706 corresponding to returning to the top of the page is presented at the page of FIG. 7C. For example, function portal 706 is presented based on a combination of the current context with respect to the presentation of the page (e.g., the end of the page is presented within the display area) and a user action (e.g., the user has scrolled down to the bottom of the page) using the rules included in the stored function configuration information corresponding to the mail application. In response to a selection of function portal 706, the top of the inbox page of the mail application is returned to.

Conventionally, the preconfigured, native operations included in pages of an application are statically located in various areas of the pages, regardless of how the user is interacting with the page and the size of the screen. However, using embodiments described herein, function portals corresponding to different operations are dynamically determined and presented at a page, depending on the current context with respect to the presentation of the current page and the current user action. As described herein, in accordance with some embodiments, a set of function configuration information is configured and stored for each application. The set of function configuration information includes one or more candidate operations for which corresponding function portals can be presented at a page of the application. In accordance with some embodiments, the candidate operations may be weighted using stored historical user operations (e.g., the number of times that a user has historically selected each function portal to activate the performance of the corresponding candidate operation). A subset of the candidate operations may be selected among the set of candidate operations and one operation is identified using the current context with respect to the page that is currently presented at the display screen of the device and the current user action. The function portal corresponding to the identified operation is then presented at the page. Therefore, using the embodiments described herein, function portals corresponding to useful operations are intuitively presented at a currently displayed page of an application, in a manner that is dynamic and dependent upon the current context of the presentation of the page and the current user action.

Figure 8:
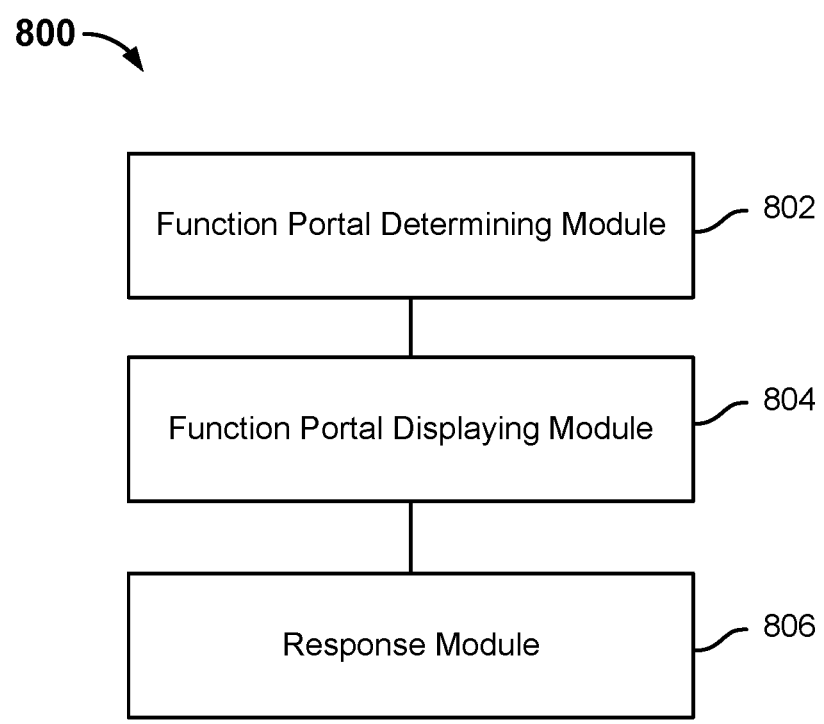
FIG. 8 is a diagram showing an embodiment of a system for dynamically presenting function portals.

FIG. 8 is a diagram showing an embodiment of a system for dynamically presenting function portals. In the example, system 800 includes function portal determining module 802, function portal displaying module 804, and response module 806.

The modules and sub-modules can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Function portal determining module 802 is configured to determine a function portal based on a context with respect to a presentation of a current page and user action at the current page.

Function portal displaying module 804 is configured to display the function portal at the current page.

Response module 806 is configured to perform an operation corresponding to a selection of the displayed function portal.

Figure 9:
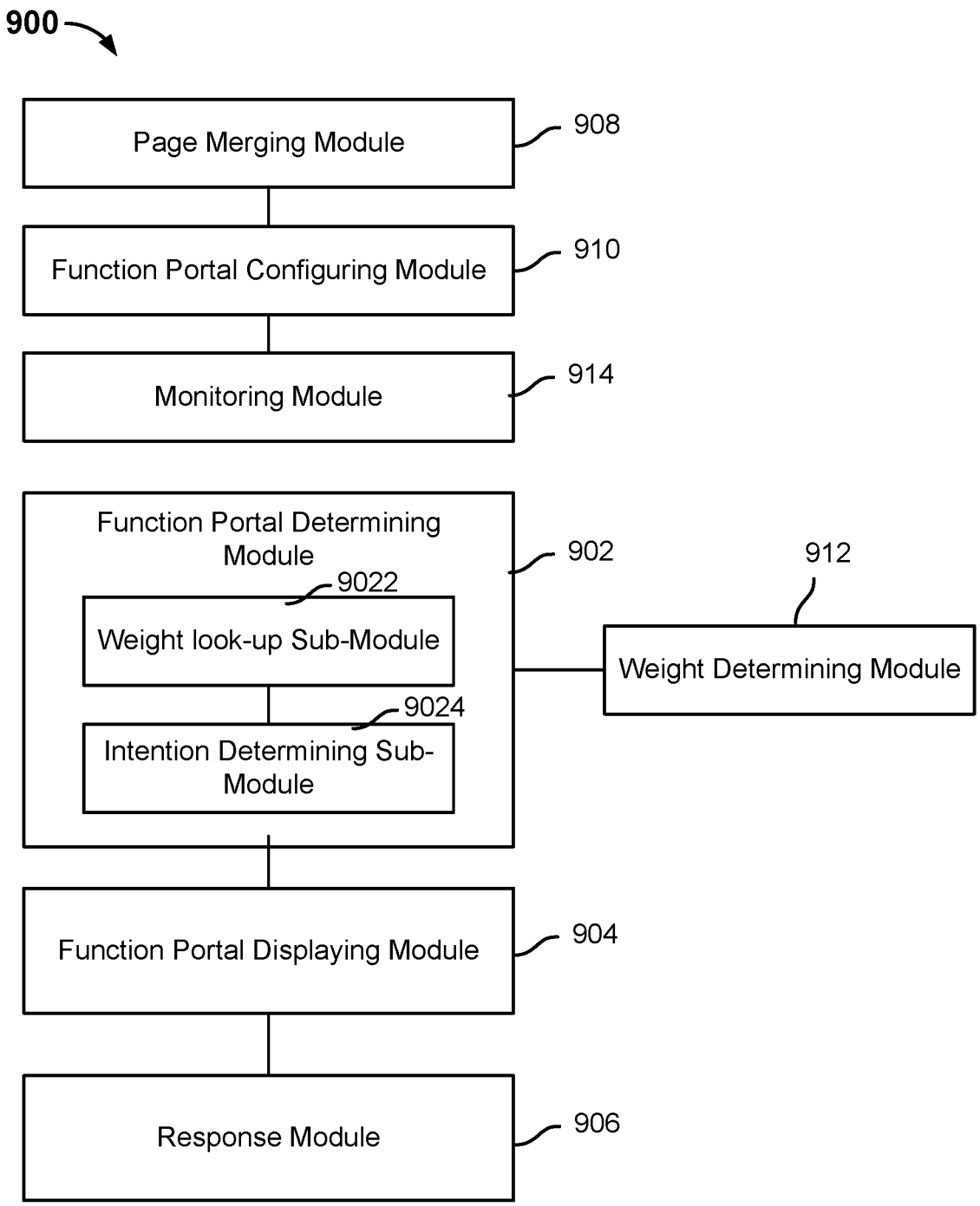
FIG. 9 is a diagram showing an embodiment of a system for dynamically presenting function portals.

FIG. 9 is a diagram showing an embodiment of a system for dynamically presenting function portals. In the example, system 900 includes page merging module 908, function portal configuring module 910, monitoring module 914, function portal determining module 902, function portal displaying module 904, and response module 906.

Page merging module 908 is configured to merge multiple pages of an application to generate a merged display page.

Function portal configuring module 910 is configured to determine one or more operations corresponding to each page of the application that are to be merged and generate a set of function configuration information corresponding to the application based on the determined operations. In some embodiments, function portal configuring module 910 is configured to generate one or more rules to be included in the set of function configuration information, where the rules are usable to determine which combination of a context with respect to a presentation of a current page and a user action maps to which candidate operation of the function configuration information to be presented at the current page.

Monitoring module 914 is configured to determine, by monitoring application activity at the device, which application is currently executing at (e.g., in the foreground of) the device and which page the application is currently displayed at the display screen of the device.

Function portal determining module 902 is configured to determine a function portal based on a context with respect to a presentation of a current page and user action at the current page.

Function portal displaying module 904 is configured to display the function portal at the current page.

Response module 906 is configured to perform an operation corresponding to a selection of the displayed function portal.

Weight determining module 912 is configured to determine the weight of each candidate operation included in the function configuration operation corresponding to each page based on user historical operating information. In some embodiments, weight determining module 912 is configured to store the weight determined for each candidate operation such that the weights can be looked up when determining which function portal should be presented at a current page.

In some embodiments, function portal determining module 902 further comprises:

Weight look-up sub-module 9022 is configured to look up a stored weight for each candidate operation corresponding to the current page in function configuration information of the application. In some embodiments, weight look-up sub-module 9022 is configured to rank the candidate operations based on their respective weights and select a subset of candidate operations (e.g., the N candidate operations with the highest weights).

Intention determining sub-module 9024 is configured to determine a user intention information based on a detected user action. In some embodiments, intention determining sub-module 9024 is configured to match the user intention in combination with the detected context with respect to the presentation of the current page to a corresponding candidate operation (e.g., that has been included in the subset selected by weight look-up sub-module 9022) based on rules included in the function configuration information. The function portal corresponding to the matched candidate operation is presented at the current page (e.g., by function portal displaying module 904).

Figure 10:
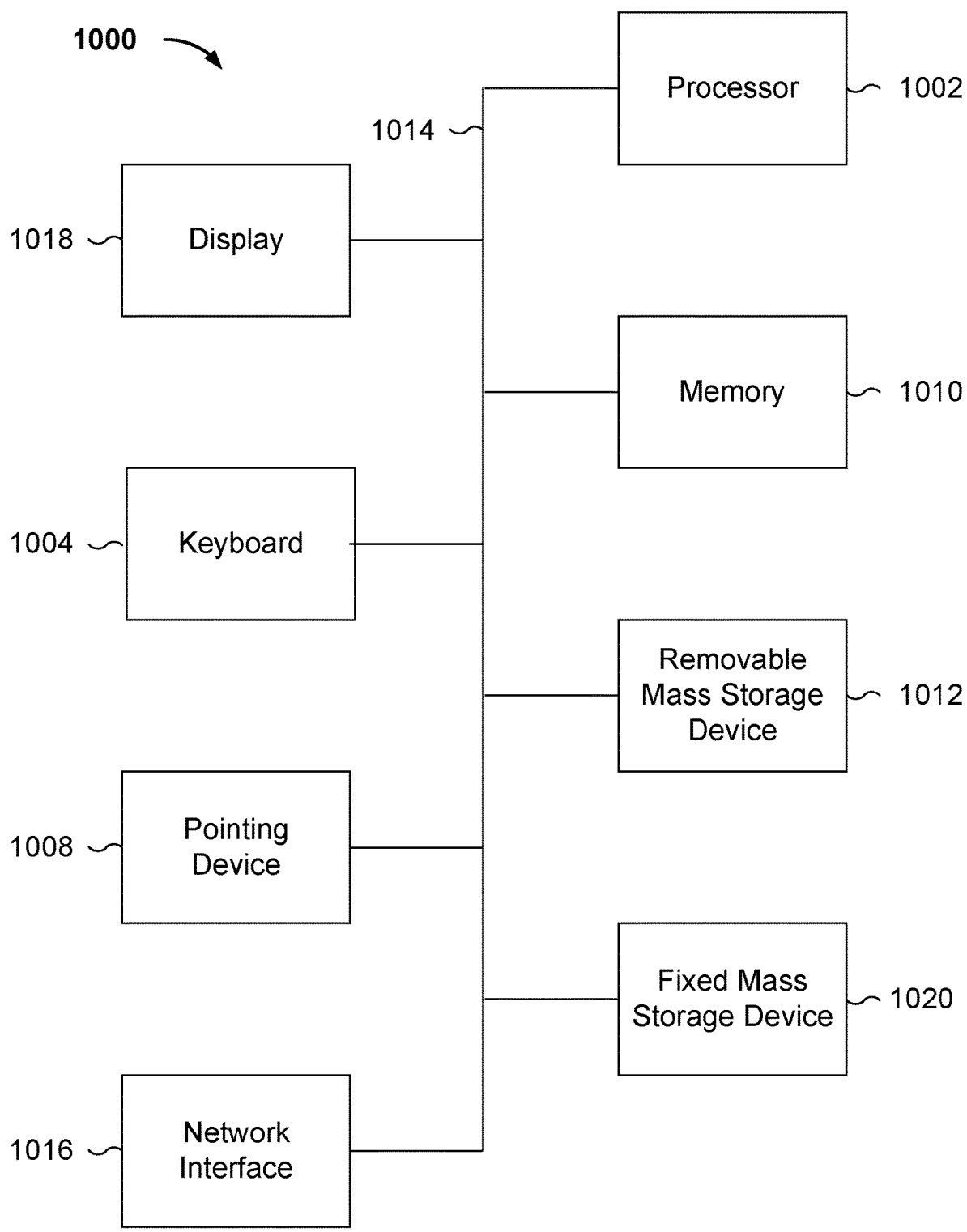
FIG. 10 is a functional diagram illustrating an embodiment of a programmed computer system for dynamically presenting function portals.

FIG. 10 is a functional diagram illustrating an embodiment of a programmed computer system for dynamically presenting function portals. As will be apparent, other computer system architectures and configurations can be used to dynamically present function portals. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer readable storage media, described below, depending on whether, for example, data access needs to be bi-directional or uni-directional. For example, processor 1002 can also directly and very rapidly retrieve and store frequently needed data in a cache memory (not shown).

A removable mass storage device 1012 provides additional data storage capacity for the computer system 1000 and is coupled either bi-directionally (read/write) or uni-directionally (read only) to processor 1002. For example, storage 1012 can also include computer readable media such as magnetic tape, flash memory, PC-CARDS, portable mass storage devices, holographic storage devices, and other storage devices. A fixed mass storage 1020 can also, for example, provide additional data storage capacity. The most common example of fixed mass storage 1020 is a hard disk drive. Mass storages 1012, 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display 1018, a network interface 1016, a keyboard 1004, and a pointing device 1008, as well as an auxiliary input/output device interface, a sound card, speakers, and other subsystems as needed. For example, the pointing device 1008 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

For example, computer system 1000 may comprise a smart phone or a computer. For example, memory 1010 is configured to store program instructions, and processor 1002, coupled to memory 1010, is configured to read the program instructions stored by memory 1010 and, in response, execute steps described in process 200 of FIG. 2 and process 300 of FIG. 3.

Each of the embodiments contained in this specification is described in a progressive manner. The explanation of each embodiment focuses on areas of difference from the other embodiments, and the descriptions thereof may be mutually referenced for portions of each embodiment that are identical or similar.

A person skilled in the art should understand that embodiments of the present application can be provided as methods, means, or computer program products. Therefore, the present application may take the form of completely hardware embodiments, completely software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

In a typical configuration, the computer device includes one or more processors (CPUs), input/output ports, network interfaces, and memory. Memory may include the following forms of computer-readable media: volatile memory, random access memory (RAM), and/or non-volatile memory, e.g., read-only memory (ROM) or flash RAM. Memory is an example of a computer-readable medium. Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media do not include non-persistent computer-readable media (transitory media) such as modulated data signals and carrier waves.

Embodiments of the present application are described with reference to flowcharts and/or block diagrams based on methods, terminal devices (systems), and computer program products of embodiments of the present application. Please note that each process and/or block within the flowcharts and/or block diagrams and combinations of processes and/or blocks within the flowcharts and/or block diagrams can be realized by computer instructions. These computer program instructions can be provided to general-purpose computers, special-purpose computers, embedded processors, or processors of other data-processing terminal devices to give rise to machines such that the instructions executed by the processors of the computers or of other programmable data-processing terminal devices give rise to means for implementing the functions specified in one or more processes in a flowchart and/or in one or more blocks in a block diagram.

These computer program instructions can also be stored in computer-readable memory that can guide computers or other programmable data-processing terminal devices to operate according to specific modes, with the result that the instructions stored in this computer-readable memory give rise to products that include instruction means. These instruction means implement the functions specified in one or more processes in a flowchart and/or one or more blocks in a block diagram.

These computer program instructions can also be loaded onto a computer or other programmable data-processing terminal device, with the result that a series of operating steps is executed on a computer or other programmable terminal device so as to give rise to computer processing. In this way, the instructions executed on a computer or other programmable terminal device provide steps for implementing the functions specified by one or more processes in a flowchart and/or one or more blocks in a block diagram.

Although preferred embodiments of the present application have already been described, persons skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Lastly, it must also be explained that, in this document, relational terms such as "first" or "second" are used only to differentiate between one entity or operation and another entity or operation, without necessitating or implying that there is any such actual relationship or sequence between these entities or operations. Moreover, the term "comprise" or "contain" or any of their variants are to be taken in their non-exclusive sense. Thus, processes, methods, things, or terminal devices that comprise a series of elements not only comprise those elements, but also comprise other elements that have not been explicitly listed or elements that are intrinsic to such processes, methods, things, or terminal devices. In the absence of further limitations, elements that are limited by the phrase "comprises a(n) . . . " do not exclude the existence of additional identical elements in processes, methods, things, or terminal devices that comprise the elements.

Detailed introductions were provided above to a page processing method, a page processing means, and a smart terminal provided by the present application. This document has applied specific examples to explain the principles and implementations of the present application. The above descriptions of the embodiments are only for the purpose of aiding the understanding of the methods and core concepts of the present application. In addition, a person with ordinary skill in the art will always be able to make modifications in keeping with the idea of the present application to specific embodiments and scopes of the application. In summary, the content of this specification should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
present a function portal at a current page of an application, wherein the function portal comprises a first function;
determine a user action with respect to the current page of the application;
determine that a native operation with respect to the current page of the application is no longer viewable within a display screen of a device as a result of the user action;
determine an updated context with respect to the application to indicate that the native operation of the current page is no longer viewable within the display screen of the device;
update the function portal based at least in part on the updated context with respect to the application, wherein the updated function portal comprises a second function, wherein the second function is associated with the native operation;
present the updated function portal at the current page of the application; and
in response to a selection of the updated function portal, perform an operation corresponding to the updated function portal at the current page of the application; and
a memory coupled to the processor and configured to provide the processor with instructions.

2. The system of claim 1, wherein the user action comprises one or more of the following: scrolling through the current page, selecting an element presented at the current page, and shaking the device.

3. The system of claim 1, wherein the updated context with respect to the application further comprises one of more of the following: which portion of the current page is viewable within the display screen of the device, which one or more native operations of the current page is viewable within the display screen of the device, function configuration information with respect to the application, and which service is provided by the current page.

4. The system of claim 1, wherein to present the updated function portal at the current page of the application comprises to overlay the updated function portal over the current page.

5. The system of claim 1, wherein the processor is further configured to:
monitor application activity at the device including to identify the application and the current page of the application; and
obtain stored function configuration information corresponding to the current page, wherein the stored function configuration information comprises a plurality of candidate operations corresponding to the application.

6. The system of claim 5, wherein to update the function portal based at least in part on the updated context with respect to the application comprises to:
identify an operation included in the plurality of candidate operations based at least in part on rules included in the stored function configuration information, wherein the updated function portal corresponds to the identified operation.

7. The system of claim 5, wherein the current page is determined based at least in part on merging a plurality of pages and wherein the plurality of candidate operations comprises existing operations associated with one or more of the plurality of pages.

8. The system of claim 5, wherein to update the function portal based at least in part on the updated context with respect to the application comprises to:
obtain a plurality of weights corresponding to respective ones of the plurality of candidate operations corresponding to the application;
identify a subset of candidate operations included in the plurality of candidate operations; and
identify an operation included in the subset of candidate operations based at least in part on rules included in the stored function configuration information, wherein the updated function portal corresponds to the identified operation.

9. The system of claim 8, wherein the plurality of weights corresponding to respective ones of the plurality of candidate operations corresponding to the application is determined based on historical user operations.

10. The system of claim 1, wherein the function portal comprises one or more of the following: a look-up portal, a search portal, an upload portal, a download portal, an edit portal, and a return portal.

11. The system of claim 1, wherein the user action comprises a user navigation through the current page of the application.

12. The system of claim 1, wherein the native operation is configured by computer code used to implement the current page of the application.

13. A method, comprising:
presenting a function portal at a current page of an application, wherein the function portal comprises a first function;
determining a user action with respect to the current page of the application;
determining that a native operation with respect to the current page of the application is no longer viewable within a display screen of a device as a result of the user action;
determining an updated context with respect to the application to indicate that the native operation of the current page is no longer viewable within the display screen of the device;
updating the function portal based at least in part on the updated context with respect to the application, wherein the updated function portal comprises a second function, wherein the second function is associated with the native operation;
presenting the updated function portal at the current page of the application; and
in response to a selection of the updated function portal, performing an operation corresponding to the updated function portal at the current page of the application.

14. The method of claim 13, wherein presenting the updated function portal at the current page of the application comprises overlaying the updated function portal over the current page.

15. The method of claim 13, further comprising:
monitoring application activity at the device including to identify the application and the current page of the application; and obtaining stored function configuration information corresponding to the current page, wherein the stored function configuration information comprises a plurality of candidate operations corresponding to the application.

16. The method of claim 15, wherein updating the function portal based at least in part on the updated context with respect to the application comprises:
identifying an operation included in the plurality of candidate operations based at least in part on rules included in the stored function configuration information, wherein the updated function portal corresponds to the identified operation.

17. The method of claim 15, wherein the current page is determined based at least in part on merging a plurality of pages and wherein the plurality of candidate operations comprises existing operations associated with one or more of the plurality of pages.

18. The method of claim 15, wherein updating the function portal based at least in part on the updated context with respect to the application comprises:
obtaining a plurality of weights corresponding to respective ones of the plurality of candidate operations corresponding to the application;
identifying a subset of candidate operations included in the plurality of candidate operations; and
identifying an operation included in the subset of candidate operations based at least in part on rules included in the stored function configuration information, wherein the updated function portal corresponds to the identified operation.

19. The method of claim 18, wherein the plurality of weights corresponding to respective ones of the plurality of candidate operations corresponding to the application is determined based on historical user operations.

20. The method of claim 13, wherein the updated context with respect to the application comprises one of more of the following: which portion of the current page is viewable within the display screen of the device, which one or more native operations of the current page is viewable within the display screen of the device, function configuration information with respect to the application and which service is provided by the current page.

21. A computer program product, the computer program product being included in a computer readable storage medium and comprising computer instructions for:
presenting a function portal at a current page of an application, wherein the function portal comprises a first function;
determining a user action with respect to the current page of the application;
determining that a native operation with respect to the current page of the application is no longer viewable within a display screen of a device as a result of the user action;
determining an updated context with respect to the application to indicate that the native operation of the current page is no longer viewable within the display screen of the device;
updating the function portal based at least in part on the updated context with respect to the application, wherein the updated function portal comprises a second function, wherein the second function is associated with the native operation;
presenting the updated function portal at the current page of the application; and
in response to a selection of the updated function portal, performing an operation corresponding to the updated function portal at the current page of the application.

* * * * *